(12) United States Patent
McHale et al.

(10) Patent No.: US 7,806,759 B2
(45) Date of Patent: Oct. 5, 2010

(54) IN-GAME INTERFACE WITH PERFORMANCE FEEDBACK

(75) Inventors: Mike McHale, San Francisco, CA (US); Eran B. Egozy, Cambridge, MA (US)

(73) Assignee: Konami Digital Entertainment, Inc., El Segundo, CA (US)

( * ) Notice: Subject to any disclaimer, the term of this patent is extended or adjusted under 35 U.S.C. 154(b) by 1063 days.

(21) Appl. No.: 10/846,420

(22) Filed: May 14, 2004

(65) Prior Publication Data

US 2005/0255914 A1 Nov. 17, 2005

(51) Int. Cl.
*A63F 13/00* (2006.01)
*G09B 15/02* (2006.01)

(52) U.S. Cl. ............................................. 463/7; 84/610

(58) Field of Classification Search .................... 463/7, 463/31, 43; 84/476, 470 R, 609, 645, 610; 704/270, 258; 434/307 A; 715/709; 345/419
See application file for complete search history.

(56) References Cited

U.S. PATENT DOCUMENTS

| | | | |
|---|---|---|---|
| 5,194,683 A | | 3/1993 | Tsumura et al. |
| 5,208,413 A | | 5/1993 | Tsumura et al. |
| 5,250,745 A | * | 10/1993 | Tsumura ................. 434/307 A |
| 5,262,765 A | | 11/1993 | Tsumura et al. |
| 5,395,123 A | | 3/1995 | Kondo |
| 5,453,570 A | | 9/1995 | Umeda et al. |
| 5,563,358 A | | 10/1996 | Zimmerman .............. 84/477 R |
| 5,565,639 A | | 10/1996 | Bae |
| 5,567,162 A | | 10/1996 | Park |
| 5,613,909 A | | 3/1997 | Stelovsky |
| 5,782,692 A | * | 7/1998 | Stelovsky ....................... 463/1 |
| 5,804,752 A | * | 9/1998 | Sone et al. .................... 84/610 |
| 5,889,224 A | * | 3/1999 | Tanaka ........................ 84/645 |
| 5,915,972 A | * | 6/1999 | Tada ....................... 434/307 A |
| 6,072,113 A | * | 6/2000 | Tohgi et al. ............... 84/470 R |

(Continued)

FOREIGN PATENT DOCUMENTS

EP 1 201 277 A2 5/2002

(Continued)

OTHER PUBLICATIONS

Wikipedia page of Beatmania game, originally released in Japan in 1997.*

(Continued)

*Primary Examiner*—Peter DungBa Vo
*Assistant Examiner*—Masud Ahmed
(74) *Attorney, Agent, or Firm*—Morgan, Lewis & Bockius LLP

(57) ABSTRACT

An in-game interface for a music video game includes one or more feedback mechanisms configured to provide feedback to a player relating to the player's performance of the music video game. A compare module compares the player's performance with a reference performance provided by the music video game. A performance evaluation module determines the performance feedback to be presented to the player while the player performs the musical composition. In some embodiments, the player's pitch and rhythm are compared against a reference pitch and rhythm. If the player's pitch and rhythm matches the reference pitch and rhythm to within a predetermined target range, then the performance feedback is positive. Otherwise, the performance feedback is negative.

42 Claims, 13 Drawing Sheets

U.S. PATENT DOCUMENTS

| | | | |
|---|---|---|---|
| 6,352,432 B1* | 3/2002 | Tsai et al. | 434/307 A |
| 6,379,244 B1 | 4/2002 | Sagawa et al. | 463/7 |
| 6,417,435 B2 | 7/2002 | Chantzis et al. | 84/477 R |
| 6,429,863 B1 | 8/2002 | LoPiccolo et al. | 345/419 |
| 6,535,269 B2 | 3/2003 | Sherman et al. | |
| 6,554,711 B1* | 4/2003 | Kawasaki et al. | 463/43 |
| 6,555,737 B2* | 4/2003 | Miyaki et al. | 84/477 R |
| 6,740,802 B1* | 5/2004 | Browne, Jr. | 84/609 |
| 7,174,510 B2* | 2/2007 | Salter | 715/709 |
| 2002/0005109 A1* | 1/2002 | Miller | 84/609 |
| 2003/0014262 A1* | 1/2003 | Kim | 704/278 |
| 2004/0186720 A1* | 9/2004 | Kemmochi | 704/258 |

FOREIGN PATENT DOCUMENTS

| | | |
|---|---|---|
| JP | 2001232062 | 8/2001 |

OTHER PUBLICATIONS

Gamespot review pafe of Guiter Freaks, release date Jul. 29, 1999.*

International Search Report for Application No. PCT/US2005/015285, dated Oct. 25, 2005, Int'l Filing Date May 3, 2005.

Office Action mailed Jul. 31, 2007 from related U.S. Appl. No. 10/846,422.

Office Action mailed Feb. 28, 2008 from related U.S. Appl. No. 10/846,422.

Office Action mailed Jul. 28, 2008 from related U.S. Appl. No. 10/846,422.

Office Action mailed Feb. 4, 2009 from related U.S. Appl. No. 10/846,422.

* cited by examiner

IN-GAME INTERFACE WITH PERFORMANCE FEEDBACK

RELATED APPLICATIONS

This application is related to U.S. patent application Ser. No. 10/846,422, filed May 14, 2004, entitled "Vocal Training System and Method with Flexible Performance Evaluation Criteria."

TECHNICAL FIELD

The disclosed embodiments relate generally to music video games, and in particular to an in-game interface with performance feedback.

BACKGROUND

The popularity of music video games has increased in recent years due in part to the introduction of affordable video game stations, such as the PLAYSTATION™ (manufactured by Sony Entertainment Corp.) and the XBOX™ (manufactured by Microsoft® Corp.). These video game stations can host a variety of interactive music games, including dancing games, rhythm-based games and pattern games. While these music video games allow a player to dance and/or play along with an underlying musical performance, many of these games are deficient in helping players significantly improve their performance while they play the game.

Accordingly, what is needed is a music video game targeted for video game stations that includes performance feedback to help players improve their performance while they play the game.

SUMMARY

The deficiencies of conventional systems and methods are overcome by the disclosed in-game interface for a music video game, which includes a first portion configured for displaying graphical representations of music notes of a musical composition. A compare module is configured to compare a player's performance of the musical composition with a reference performance of the musical composition provided by the music video game. A performance evaluation module is coupled to the compare module and configured to generate performance evaluation data based on results of the comparison of the player's performance with the reference performance. A second portion includes a first feedback display mechanism coupled to the performance evaluation module and configured to provide a first feedback indicative of the player's performance of the musical composition based on the performance evaluation data.

In some embodiments, an in-game interface for a music video game includes a background portion configured to generate an animated representation of a player of the music video game and a virtual audience. A performance feedback interface is configured to display graphical representations of music notes of a musical composition. A compare module is configured to compare the player's performance of the musical composition with a reference performance of the musical composition provided by the music video game. A performance evaluation module is coupled to the compare module and configured to generate performance evaluation data for the player. A first feedback mechanism is disposed in the performance feedback interface and coupled to the performance evaluation module. The first feedback mechanism is configured to provide feedback indicative of the player's performance of the musical composition based on the performance evaluation data. A second feedback mechanism is disposed in the performance feedback interface and coupled to the compare module. The second feedback mechanism is configured to provide a feedback indicative of the reaction of the virtual audience to the player's performance of the musical composition.

DESCRIPTION OF EMBODIMENTS

In-Game Interface Overview

Figure 1:
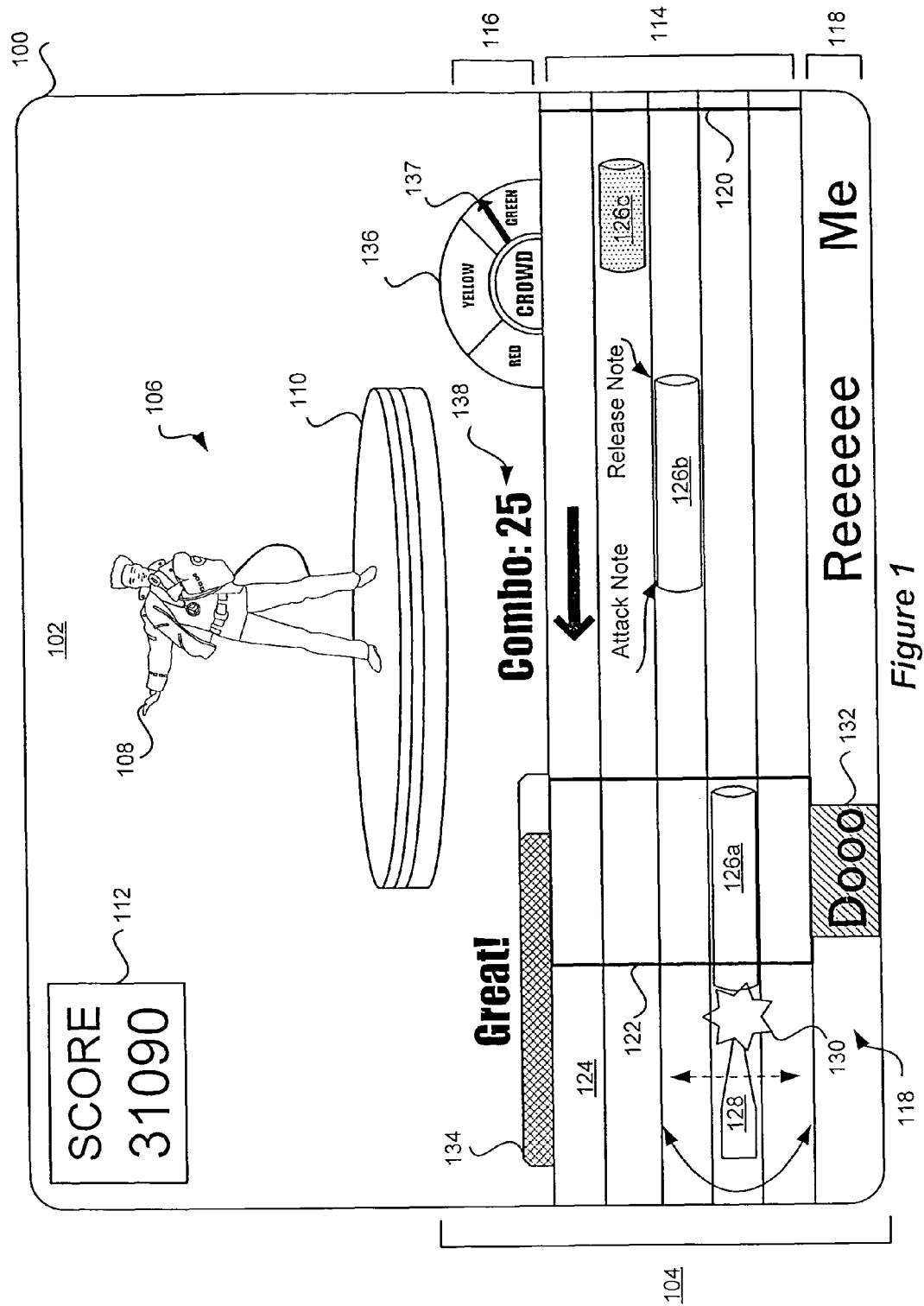
FIG. 1 is an illustration of an embodiment of an in-game interface with performance feedback for a music video game.

FIG. 1 is an illustration of an embodiment of an in-game interface 100 with performance feedback for use with a music video game, such as a Karaoke style singing game. The in-game interface 100 can be presented to one or more players on a display device, such as a computer monitor or television screen. Consistent with the basic premise of Karaoke, lyrics and notes are presented to players in the in-game interface 100, encouraging them to sing along with a musical composition, such as a popular song performed by a professional singer or band (hereinafter also referred to as a "reference performance"). The music game analyzes a player's singing skills, then judges the player's vocal performance based on a variety of factors. The results of this analysis is presented to the player via the in-game interface 100 while the player is performing the song, thus enabling the player to adjust their performance on-the-fly to increase their score.

While the disclosed embodiments that follow are directed to a Karaoke style singing game, it should be apparent that the disclosed embodiments can be adapted to any music video game where the player is required to sing or play a musical instrument.

Background Graphics

In some embodiments, the in-game interface 100 includes two-dimensional (2D) or three-dimensional (3D) background graphics 102 and a performance feedback interface 104 disposed on top of the background graphics 102. The background graphics 102 includes a virtual environment 106 that includes an animated main character 108 (hereinafter also referred to as a Playable Character) and one or more props 110 (e.g., stage, lights, band members, audience, etc.) that occupy the virtual environment 106. The main character 108 represents the player on the screen, Its animations can be categorized and built based on a specific music genre (e.g., Rock/Alternative, Pop/R&B/Dance, Slow/Ballads, etc.). In some embodiments, the animations of the character 108 can be triggered by the tempo of the underlying musical performance (e.g., upbeat and/or downbeat), so that the character 108 appears to be moving or dancing in rhythm to the music. In alternative embodiments, a scripted set of animations could be triggered from time to time throughout the song based on a Game State (e.g., player's current score and level of progression in the game). For example, if the player's vocal performance is highly rated, then the main character 108 may start dancing or gesturing more vigorously to invoke a reaction from the audience.

In some embodiments, the background graphics 102 includes a score window 112 or other graphic for presenting a player's current score during their performance.

Performance Feedback Interface

The performance feedback interface 104 includes a music staff 114, a performance meter section 116 and a lyric bar 118. The music staff 114 is derived from a music staff used in traditional sheet music (e.g., a Treble Clef). It includes a set of horizontal, parallel lines, for displaying the notes of a musical composition. Additional lines can be added to the music staff 114, as needed, to ensure that all the notes of the musical composition are visible to the player. In this manner, players who can sight read sheet music are able to easily sing the songs.

In some embodiments, sharp and flat symbols are displayed on the music staff 114 to accurately represent the pitch of a note. In alternative embodiments, the key of the song with sharps and flats can be displayed on the left side of the music staff 114, as is commonly done in sheet music.

In some embodiments, the notes of the song are displayed on the music staff 114 as note tubes 126. It should be apparent, however, that other graphical representations can be used to represent notes (e.g., circles, squares, arrows, etc.). The location of a note tube 126 on the music staff 114 indicates its pitch relative to other note tubes 126 on the music staff 114. In some embodiments, the widths of the note tubes 126 can vary to represent notes that are held for a duration of time, notes that change in the middle of being held, or a lyric that has multiple syllables going up or down in the music staff 114. In alternative embodiments, the size and orientation of a note tube 126 shows a player how long to hold and/or bend a note. For example, the note tube 126b can be rotated about its z-axis (looking out of the page in a right-handed Cartesian coordinate system) to show a player how to bend the note.

In some embodiments, the music staff 114 includes a phrase bar 120, a highlight bar 122 and an evaluation area 124. The phrase bar 120 is a vertical bar on the music staff 114 which separates the song into separate phrases. A "phrase" is defined as a sequence of notes and lyrics, which is equivalent to one line of lyrics in a song, and not necessarily equivalent to one bar of music. The highlight bar 122 is a stationary vertical box on the lower left-hand side of the music staff 114 and indicates to the player (as explained below) when a note should be sung. The evaluation area 124 is the area to the left of the highlight bar 122 and is used to provide visual feedback on whether a note was sung correctly or not. In some embodiments, if the note was perfectly hit (within an acceptable target range of pitch and/or rhythm), the note tube 126 will transform (e.g., turn bright silver or other color, glow, particle effect, etc.) as it passes through or under the highlight bar 122. If the note is sung incorrectly, the note will take on a different form (e.g., turn black or other color, include jagged edges around the note tube, etc.).

The evaluation area 124 also includes a pitch arrow 128, which rotates about its z-axis (out of the page) to indicate whether the player sang the note under the highlight bar 122 too high or too low. In some embodiments, the name of the pitch the player is currently singing (e.g., C, C#, D, etc.) can be displayed next to the pitch arrow 128, so that the player can see what note they are hitting. The pitch arrow 128 provides performance feedback to the player, which can be used by the player to adjust their pitch during their performance.

Singing and Voice Analysis

During a song, the music staff 114 moves from right to left, displaying the note tubes 126 that make up the melody line of a musical composition. The accompanying lyrics sit below the music staff 114 in the lyric bar 118, and each lyric syllable 132 lines up vertically with its corresponding note tube 126 displayed on the music staff 114. When a note tube 126 moves under the highlight bar 122, this indicates to the player that the note should be sung at that time. In some embodiments, the font size or font type of the current lyric syllable 132 can be adjusted (e.g., increased) as the note tube 126 enters the highlight bar 122 to emphasize the current lyric syllable 132. Also, the beginning and end of the note tube 126 can be embellished to indicate the attack and release of the note. In some embodiments, the player will be expected to hold the note as the note tube 126 moves through the highlight bar 122 to receive positive scoring.

In some embodiments, the player's performance is rated on at least two performance parameters: rhythm and pitch. The rhythm parameter measures how well the player stays in time with the song and/or how well a player holds a long note. The pitch parameter measures how well the player's pitch matches the underlying lead vocal performance (hereinafter also referred to as "reference pitch"). When a note tube 126 enters the stationary highlight bar 122, the player attempts to sing the note. The music game processes the microphone input and analyzes how close the player's singing matches the correct pitch and rhythm for each note identified in the song. One or more performance feedback mechanisms in the evaluation area 124 indicate if the note was hit or missed and the Game State changes based on how well the player sings each phrase of the song. For example, if the player sings the note in the highlight bar 122 "flat" compared to the correct pitch of the note, then the pitch arrow 128 rotates downward towards the bottom of the music staff 114, indicating to the player that the note was sung too low. Similarly, if the player sings the note "sharp" compared to the correct pitch of the note, then the pitch arrow 128 rotates upwards toward the top of the music staff 114, indicating to the player that the note was sung too high. If the player sings the note within a target range of the correct pitch of the note, then the pitch arrow 128 points in a direction parallel to the horizontal lines of the music staff 114 and collides with the note tube 126 in the evaluation area 124.

In addition to rotating about its z-axis, the pitch arrow 128 lines up with the next note tube 126 to enter the highlight bar 122 by moving up and down vertically in the music staff 114. In an alternative embodiment, the pitch arrow 128 can remain fixed in the vertical direction (y-axis) and the music staff 114 can move up or down vertically depending upon the pitch of next note tube 126 to enter the highlight bar 122. If the pitch arrow 128 collides with the note tube 126, then a visual indicia 130 is presented at the contact point to represent the collision (i.e., perfectly matched pitch). Such visual indicia 130 can include embellishing the note tube 126 with a color or a particle effect. In some embodiments, the pitch arrow 128 changes color (e.g., green) and sparks fly if the player's pitch matches the reference pitch and changes to a different color (e.g., red) if the player's pitch does not match the reference pitch.

Score Enhancement

To add additional excitement to the game, some of the note tubes 126 can be embellished to indicate a score enhancement opportunity. For example, the note tube 126c is a "sparkling" note tube because it is associated with a lyric or note that can excite the crowd if sung correctly (e.g., a difficult high note). If a player correctly sings the note tube 126c, their score is enhanced, relative to the scores awarded for correctly singing the note tubes 126a and 126b. In some embodiments, if a player correctly sings a combination of notes (i.e., a phrase), they are awarded with a Combo score 138.

Lyric Bar

In some embodiments, the lyric bar 118 is located under the music staff 114. When the song begins, song lyrics appear in the lyric bar 118 and scroll from right to left towards the stationary highlight bar 122. The current lyric syllable 132 to be sung by the player is highlighted or otherwise visually identified to the player as it reaches the highlight bar 122. Preferably, each lyric syllable lines up with a corresponding note tube 126 on the music staff 114 to enable the player to visually associate the current lyric syllable 132 with the note.

Performance Meter Section

In some embodiments, the performance meter section 116 of the performance feedback interface 104 includes a performance meter 134 and a crowd meter 136 for presenting additional performance feedback to the player. In some embodiments, the performance meter 134 is a bar graph that is filled or unfilled with colors or patterns based on the player's performance. Each phrase sung by the player is rated and the performance meter 134 is filled based on the rating. If the note was performed perfectly, then the performance meter 134 reflects that performance by completely filling the bar, and if the player's pitch was close to the correct pitch but not exact, then the performance meter 134 would partially fill to reflect the degree of matching between the player's pitch and the correct pitch. In alternative embodiments, the performance meter 134 is continuously filled and unfilled based on the player's average performance over multiple phrases of the song. Points can be added or subtracted from the player's current score 112 based on the level to which the performance meter 134 is filled or unfilled. In addition to a bar graphic, the player's performance rating (e.g., Lousy, Bad, Fair, Good, Great, etc.) and/or current score can be displayed near the performance meter 134 to provide the player with additional performance feedback.

Figure 2:
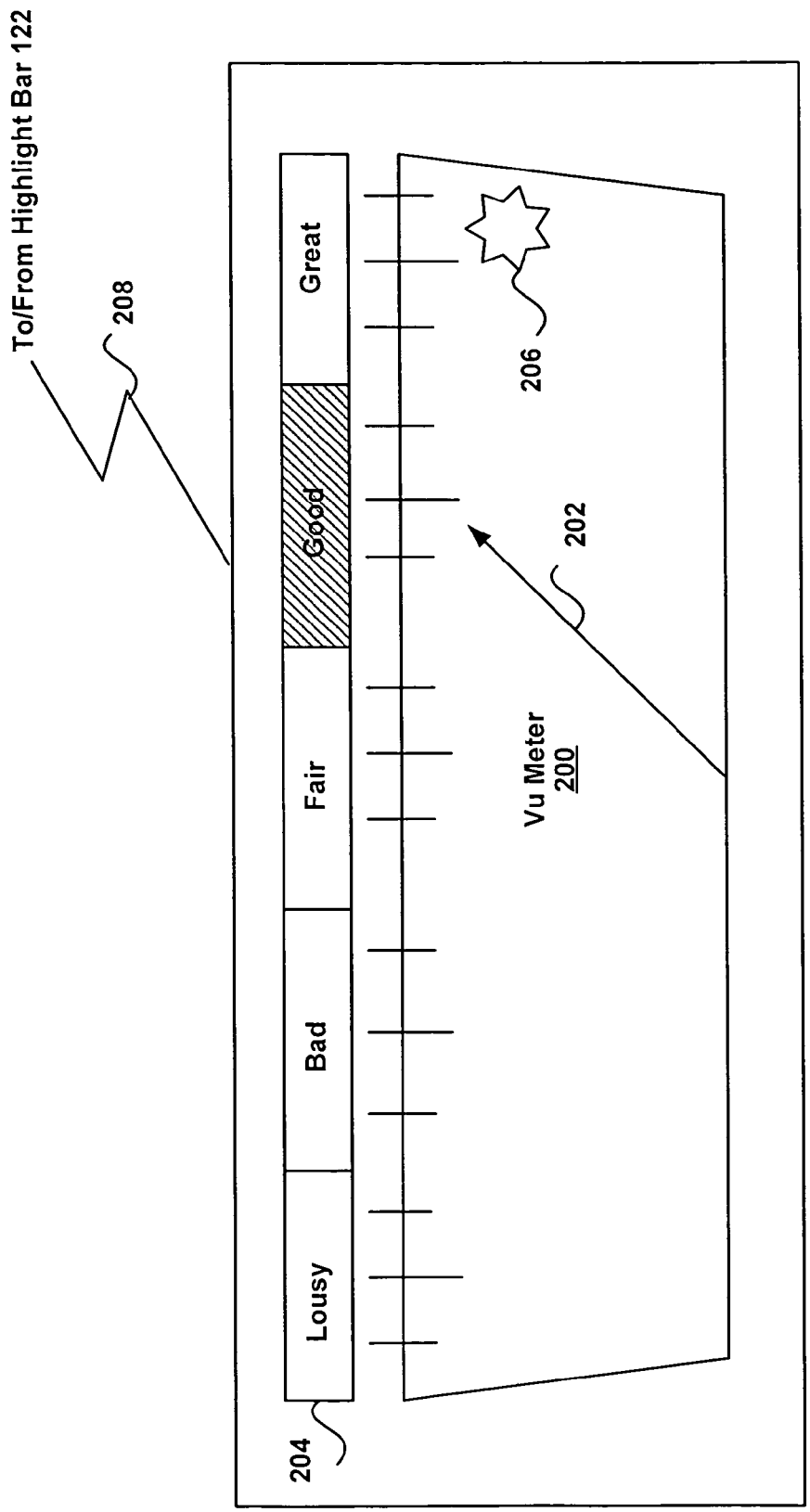
FIG. 2 is a block diagram of an alternative embodiment of a performance meter for the in-game interface of FIG. 1.

FIG. 2 is a block diagram of an alternative embodiment of a performance meter 134 for the in-game interface 100 of FIG. 1. In this embodiment, a performance meter 200 looks similar to a Volume Unit (VU) meter typically found on sound mixing boards to measure the strength of an audio signal. As the player sings, a needle 202 moves up and down to indicate the player's performance rating from a set of performance ratings 204 (e.g., Lousy, Bad, Fair, Good, and Great). As the player sings, their rating 204 can increase, stay the same or decrease. In some embodiments, if the needle 202 moves towards a lower rating (e.g., Lousy), the meter 200 gets dimmer, and if the needle 202 moves towards a higher rating (e.g., "Great"), the meter gets brighter. In some embodiments, a little red light 206 on the face of the meter 200 lights up if the needle 202 is pinned to the maximum setting of the meter 200.

In an alternative embodiment, a graphic 208 representing energy or a lightening bolt 208 can be shown connecting the highlight bar 122 and the meter 200 based on the player's rating. For example, if a phrase is sung well, the lightening bolt 208 shoots out from the highlight bar 122 to the meter 200 or vice-versa. If the phrase is sung badly, the lightening bolt 208 fizzles back from the meter 200 to the highlight bar 122.

Referring again to FIG. 1, another meter that may be included in the performance meter portion 116 of the performance feedback interface 104 is the crowd meter 136. The crowd meter 136 is a graphic that provides an indication of the state or level of excitement of an audience in the virtual environment 106. In some embodiments, the crowd meter 136 sits on top of the music staff 114 and includes a needle 137 similar to the needle 202, described with respect to FIG. 2. The needle 137 points to one of a set of performance ratings disposed on the face of the meter 136. In some embodiments, the ratings are simply colors (Red, Yellow, Green), which indicate the current state of the virtual audience or crowd. For example, when the needle 137 is pointing at the Green rating, the crowd is excited about the player's performance. Similarly, if the needle 137 points to a Red rating, then the crowd is displeased with the player's performance. If the crowd reaction falls somewhere in between, then the needle 137 points to a Yellow rating between the Red and Green ratings. In some embodiments, the crowd meter 136 is used to trigger activity or events in the background graphics 102. For example, if the crowd meter needle 137 is pointing to the Red rating (i.e., poor crowd reaction), a new animation script can be played showing the audience leaving the venue or ceasing to dance or clap.

It should be apparent that the performance meter 134 and the crowd meter 136 shown in FIG. 1 represent particular embodiments of performance feedback mechanisms, and more or fewer performance mechanisms can be used in the performance feedback interface 104, as desired, based on the game design.

Scoring System

Figure 3:
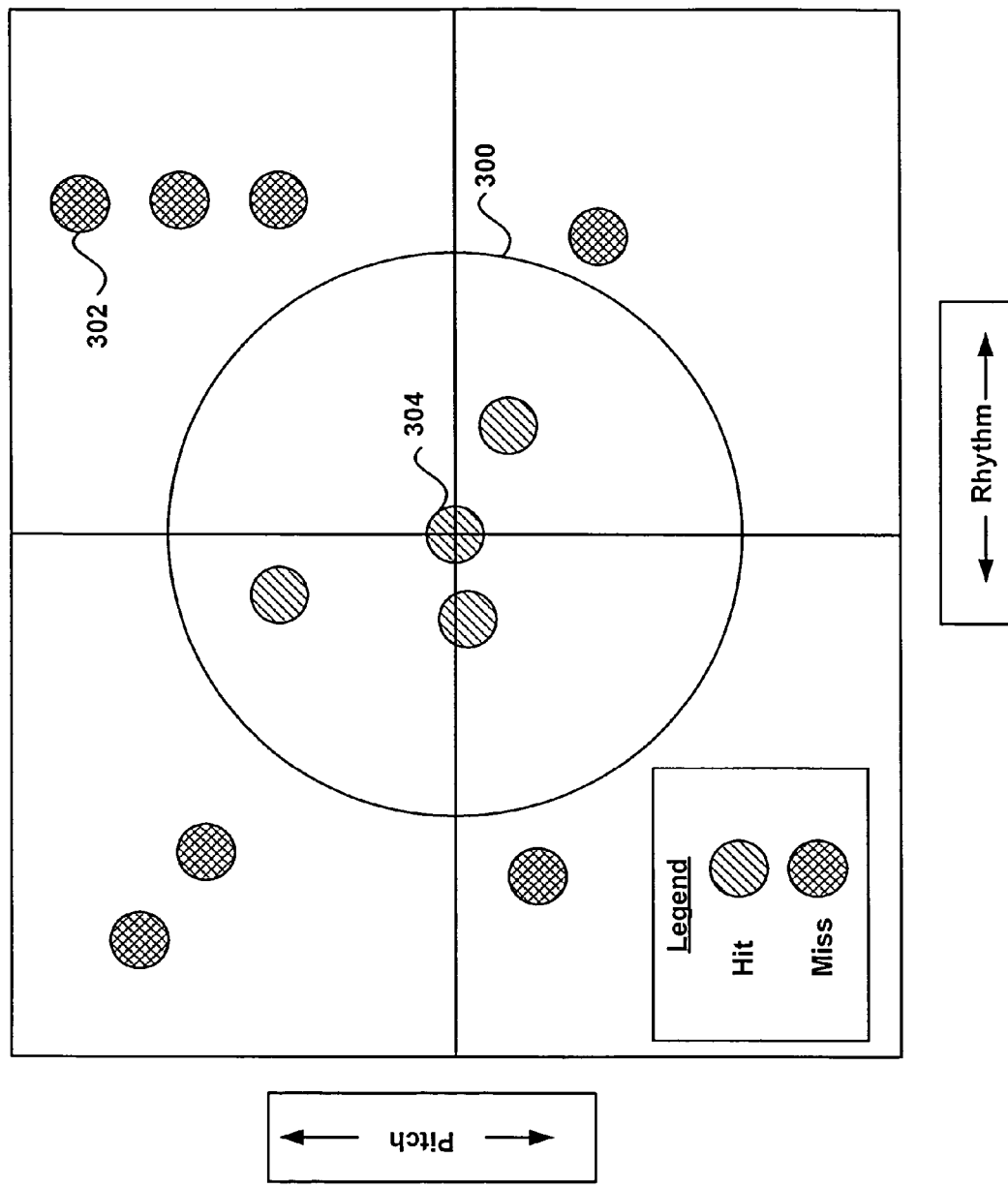
FIG. 3 is a graph illustrating an embodiment of a scoring system for a music video game.

FIG. 3 is a graph illustrating an embodiment of a scoring system for a music game. In some embodiments, scoring is based on how accurately the player matches rhythm and pitch with a lead vocal track, note by note. Notes can be analyzed separately or as a group and will be scored as either correct (Hit) or incorrect (Miss). In FIG. 3, the circle 300 delineates a region where a player's pitch and rhythm are correct within a selected target range. For example, a note 302 was sung incorrectly in pitch (too high) and in rhythm (too late). By contrast, the note 304 was perfectly sung in both pitch and rhythm.

In some embodiments, the notes in the song are divided up into separate phrases. Each phrase is equivalent to one line of lyrics in the song. Each note in the phrase has an absolute outcome—either Hit (player matches note within parameters) or Miss (player fails to match the note correctly). When the phrase is sung, the Hits and Misses are compiled for that phrase and the phrase is rated. Some examples of phrase ratings and point assignments are: Yes: 1 point, OK: 0 points, and No: −1 point. Note that these ratings preferably are transparent to the player and are presented here only for discussion purposes.

Using these phrase rating examples, if a phrase was sung 100% correctly with all Hits, the phrase is rated "Yes" and assigned one point. If the phrase was sung with one Miss (e.g., one bad note), the phrase is rated "OK" and no points are assigned. If the phrase is sung badly (e.g., two or more Misses), the phrase is rated "No" and a negative point is assigned. These example phrase ratings can then be communicated to the player at the end of each phrase via the various performance feedback mechanisms previously discussed (e.g., performance meter 134).

For embodiments that include the VU meter 200 of FIG. 2, at the beginning of each song the needle 202 will point at the fair rating 204. If the next phrase is rated Yes, the needle 202 will move up one unit. If the phrase is rated OK, the needle 202 will not move at all. A unit can be defined as necessary to cover the range of ratings 204. For example, a unit can be defined as ½ step up/down between ratings 204, so that a player would have to perform multiple Hits to reach the next higher rating or multiple Misses to be demoted to a lower rating.

Level Scoring

Figure 4:
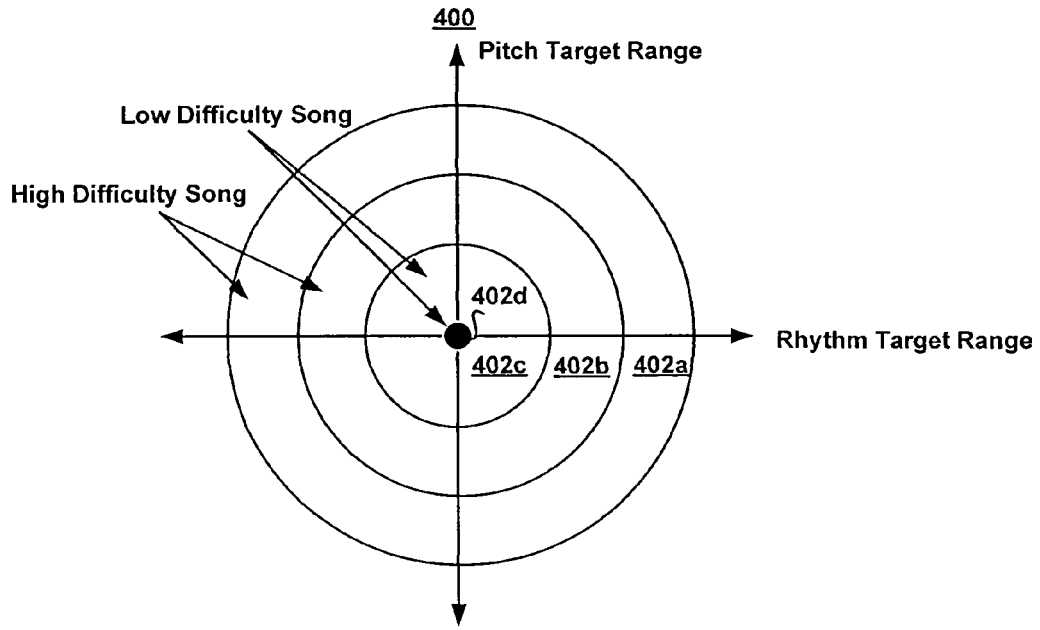
FIG. 4 is graph illustrating an embodiment of a scoring system based on pitch and rhythm for a music video game.

FIG. 4 is graph illustrating an embodiment of a level scoring system 400 based on pitch and rhythm for a music video game. The scoring system 400 includes one or more target ranges 402 for pitch and rhythm. The target ranges 402 can be increased or decreased based on the difficulty of the song, phrase or note to be sung. For example, if a player sings a note within a selected target range 402, then the note will be deemed to have been sung correctly. If a player sings a note outside the selected target range 402, then the note will be deemed to have been sung incorrectly. Referring to FIG. 4, it should be apparent that target ranges 402a and 402b can be used for difficult songs to allow the player more room for error, and the target ranges 402c and 40d can be used for easier songs to allow the player less room for error.

Figure 5:
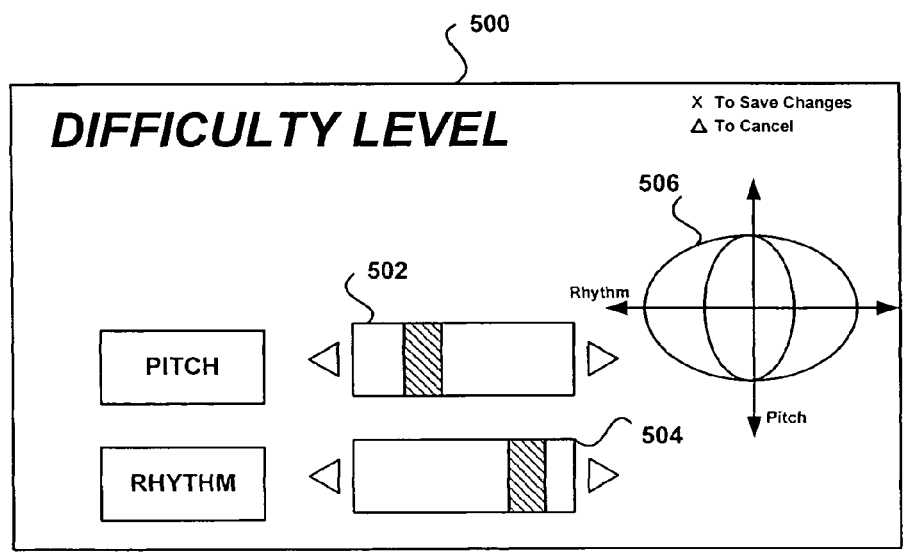
FIG. 5 is an illustration of an embodiment of an interface for setting difficulty levels for pitch and rhythm parameters in a music video game.

FIG. 5 is an illustration of an embodiment of an interface 500 for setting difficulty levels for pitch and rhythm parameters in a music video game. A player can independently select difficulty levels for pitch and rhythm using sliders 502 and 504, respectively, or any other types of controls typically used in software interfaces (e.g., pushbuttons, hotspots, etc.). The player's current selection can be presented to the user as a plot 506 or any other graphic that can indicate the player's selection (e.g., text).

In some embodiments, the scoring for a progression level or song can be determined by the amount of time the player is associated with a particular performance rating (e.g., Lousy, Bad, Fair, Good, Great, etc.). The percentage of phrases scored for each performance rating can be scaled by a multiplier and divided by the total number of performance ratings (e.g., 5). A sample calculation for a level scoring system with five performance ratings shown in Table I below. For this example, the multipliers for the five performance ratings are as follows: Lousy—1, Bad—2, Fair—3, Good—4, and Great—5.

TABLE I

Level Scoring Examples

| Player/Rating | Lousy | Bad | Fair | Good | Great | Score |
|---|---|---|---|---|---|---|
| Player A | 10 | 20 | 20 | 40 | 10 | 64 |
| Player B | 40 | 10 | 20 | 20 | 10 | 50 |
| Player C | 0 | 0 | 20 | 40 | 40 | 84 |

Referring to Table I, Player A sang 10% of the phrases with a Lousy rating, 20% of the phrases with a Bad rating, 20% of the phrases with a Fair rating, 40% of the phrases with a Good rating, and 10% of the phrases with a Great rating. Applying the appropriate multipliers, Player A will receive a score of 64, which is computed as follows:

Total Score:

$$\frac{[(10\% \times 1) + (20\% \times 2) + (20\% \times 3) + (40\% \times 4) + (10\% \times 5)]}{5} = 64$$

Note that the level scoring scheme described above is for illustration purposes and other level scoring schemes can be used, as needed, depending upon the game design.

Based on a player's score after a song, they will receive an award and may progress to the next level. Also, the player may be able to unlock one or more items, levels and/or songs. Some level award system examples based on scoring ranges are shown in Table II below.

TABLE II

Level Award System Examples

| Award Level | Fail | Pass | Gold Record | Platinum Record |
|---|---|---|---|---|
| Scoring Range | <50 | 50-69 | 70-89 | 90-100 |
| Result | Cannot go to next level | Can go to next level | Unlock some items | Unlock more items |

Referring to Table II, a player who receives a score less than 50 has failed and cannot progress to the next level. A player who receives a score in the range of 50-69 has passed and can progress to the next level. A player who receives a score in the range of 70-89 has passed and will receive a Gold Record award, which enables the player to unlock one or more items. A player who receives a score in the range 90-100 has passed and received a Platinum Record, which enables the player to unlock more items, which can be more desirable than items unlocked at the Gold Record award level.

Game State

In some embodiments, the virtual environment 106 will change to reflect various venues based on a Game State. The Game State may be based on the current performance rating of the player, such as Lousy, Bad, Fair, Good and Great. Various character, crowd and venue animations can be triggered by the Game State. For example, characters will gather around the Playable Character 108 and cheer him/her on if the Game State is high (e.g., Good or Great performance rating). The venues will fill up and come "alive" as the virtual crowd cheers on the Playable Character. Fireworks, lighting and other elements typical of an on-stage performance can be triggered based on a high Game State. By contrast, if a Game State is low, people will shake their heads, boo, walk away in disgust and the Playable Character 108 will lose the crowd.

Each venue can have its own set of scripted events, which are triggered by specific sections of the song based on the Game State.

In some embodiments, each song will include a script that will drive all the activity within the virtual environment 106. The scripts will check the Game State from time to time during the player's performance of a song, and different character animations, crowd animations and special effects (SFX) will be triggered based on the Game State. The animation of the Playable Character 108 can also be effected by the Game State, and will reflect the effort/quality the player is putting into their performance. In some embodiments, when the Game State is high, the Playable Character 108 is scripted to do spectacular dance moves or gestures. When the Game State is low, "bad" animations are triggered, such as the Playable Character 108 stumbling or slumped over. An example of a Game State Breakdown based on five performance ratings is shown in Table III below.

Animation System

Characters

The virtual environment 106 can be occupied by one or more types of characters, including the Playable Character 108, Unlockable Characters, Stage Characters and Non-playable Characters. The Playable Character 108 is the on-screen representation of the player. Unlockable Characters are special characters that are featured in various venues. Stage Characters are characters on stage (e.g., band, Disc Jockey, etc.). Non-playable Characters include crowd members and other characters in the virtual environment 106. Various levels of detail can be assigned to the foregoing character types. For example, the Playable Character 108 and Unlockable Characters could have the highest level of detail, Stage Characters could have medium levels of detail, and Non-playable Characters could have low detail. It should be apparent, however,

TABLE III

Game State Breakdown Examples

| Feature/Game State | Lousy | Bad | Fair | Good | Great |
|---|---|---|---|---|---|
| Crowd Size | People have walked away, a few people, booing, sad or not paying attention, and sitting. | The crowd is slightly larger, filling more seats, disgusted or not paying attention. | Crowd is medium-sized, sitting down, but grooving to the music and showing interest. | Crowd is full, on their feet, dancing to the music, and looking excited. | Crowd is huge. Crowd is on their feet, going nuts, hands in the air, fists shaking, jumping up and down. |
| Crowd SFX | Outright booing, silence. | Muffled hum, not very much noise. | Some light clapping. | Medium clapping, cheers, and whistles. | Off the charts screaming, whistling and cheering. |
| Crowd Extras | Throw tomatoes or garbage, and walk away. | Shake head in disgust, push hand forward to "wave off", thumbs down. | Clapping, and bobbing heads. | Cheering, dancing, look at each other and smile/nod head. | Jumping up and down, waving hands, pumping fist, flicking lighters, and going nuts. |
| Venue Lighting (depending on venue) | Dim, stationary, single spotlight, white light. | Brighter, some stage lights, and colored lights. | Bright, moving, flashing lights, and stage lights have more color changes. | Lots of color changes and movement, including spotlights. | Increased lighting, lasers, over the top. |
| Performance Meter | Dim, pinned to the left. | Brighter | Bright and moving a bit. | Shining brightly, and moving faster. | Extra red light goes on, and meter is pinned and shaking. |
| Particle Effects | None. | None. | Small use of sparks, fog, smoke, etc. | Fireworks | Full fireworks, flames, explosions, etc. |
| Stage Characters | Special "Lousy" animations | | | | Special "Great" animations |
| Playable Character | Special animations, | Special animations | Generic/scripted animations | Special animations | Special animations | that more or fewer character types can occupy the virtual environment 106 with varying degrees of detail, as needed, based on the game design.

The Playable Character 108 can wear one or more outfits selected by the player, which reflect the major music genres that are represented in the game, as well as to offer varied ethnicity and style (e.g., Caucasian male, Latino female, African-American male, etc.). In some embodiments, the Playable Character 108 includes real-time lip sync animation or the illusion of real-time lip sync animation. Real-time lip sync can be accomplished by animating the face of the Playable Character 108 based on the player's live vocals. For example, the player's pronunciations of a word, vowel, or syllable could be used to trigger predetermined animations of the face of the Playable Character 108. An illusion of real-time lip sync can be accomplished by creating the lip sync animation during production using a lead vocal track. Alternately, during the game, if there is input from the player's microphone, the existing lip sync animation will animate the face of the Playable Character 108. If there is no input from the microphone, the animation will stop.

Throughout various modes of the game (discussed below), players will be able to unlock specific Playable Characters 108. These Playable Characters 108 will become unlocked after the current level of progress is completed satisfactorily based on requirements that vary with the particular mode of the game. Once unlocked, the player will have the ability to use that Playable Character 108 in any mode of the game. Unlockable Playable Characters can include, without limitation, '60s hippie, '70s disco queen, '80s punk rocker, etc.

The Stage Characters make up the on-stage supporting cast of the Playable Character 108. These characters appear on stage 110 with the character 108 wearing outfits appropriate for the music genre. In some embodiments, the Stage Characters are built into groups to represent the various music genres in the game. Some examples of Stage Characters include DJs, dancers, accompanying musicians, bartender, etc.

The Non-playable Characters make up the crowd, staff, participants, etc., in the various performance venues manually selected by the player or automatically by the game. Due to their lesser significance in the game, the Non-playable characters can be generated from two-dimensional characters combined with specific 3D cut scenes of crowd close-ups, or short cycling animations, to reduce processing overhead.

Venues

The Playable Character can perform in multiple venues in the game, each different from the others. These venues can include one or more props 110 to provide an atmosphere of a basic practice room, street corner, Karaoke bar, subway platform, bowling alley, small club, recording studio, a stadium/arena, etc. The range of complexity in the various venues provide a logical progression of player's performance goals through the game. For example, in some embodiments, as the player's performance rating improves, the player moves to larger and more complex venues to simulate the career path of a rising artist.

Gameplay Modes

The game can be played in various modes. In some embodiments, the gameplay modes include Showtime, Arcade, Karaoke, Training, and Practice. Each of these modes will be described below in turn. It should be apparent, however, that the game could have more or fewer gameplay modes, or a different set of gameplay modes, as needed, depending upon the game design.

Showtime Mode

The Showtime mode includes several screens that encompass various features of the game. In the Showtime mode, the player can select a difficulty level from a Level Select interface 500 (FIG. 5). In addition to skill level, the player can select a song from a Song Select interface 1000 (FIG. 10) based on their skill level and/or level of progression in the game. In some embodiments, songs are categorized based on their difficulty to perform. Some example categories include Beginner, Intermediate, and Advanced. A player can select one or more songs from a category by scrolling or otherwise searching through the song categories. The song titles are displayed to the user, together with related information, including score information (e.g., highest scores, current player's score, ratings, etc.). Once the player has selected a song, the player can choose to either "practice" or "sing" the selected songs. In some embodiments, in the game modes where scoring is enabled, a player may compete to achieve a High Score for a song. The High Score is saved in a Game State file 1127 (FIG. 11) and displayed on the Song Select interface 1000, together with the name of the player who earned the score.

Figure 8:
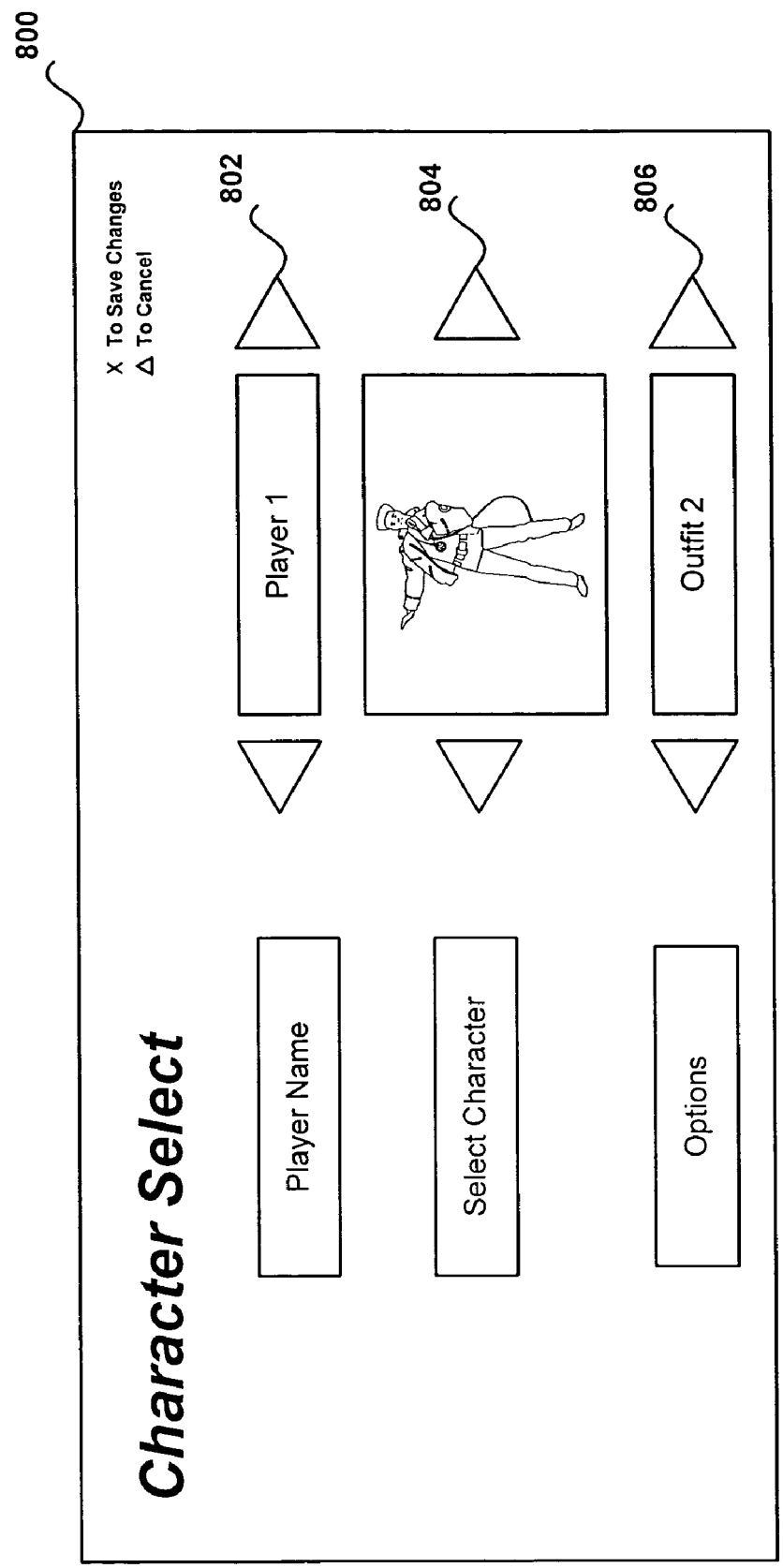
FIG. 8 is an illustration of an embodiment of an interface for selecting playable characters and other options in a music video game.

In some embodiments, the Playable Character 108 is selected by a player via a Character Select interface 800 (FIG. 8), which remains fixed for the duration of the game. If the player exits the game and later returns, the game remembers the most recent Playable Character 108 selection. If the player wants to change to another Playable Character 108 entirely, they can do so from the Character Select interface 800 (FIG. 8).

In some embodiments, an unlocking scheme is used to reward a player for performing well. The player is provided with awards and a set of unlocked items throughout the game. An example award that can be unlocked for a player is a new outfit for their Playable Character 108. At the beginning of a player's progression through the game, the Playable Character 108 can be wearing one of multiple available outfits. As the player progresses through various skill levels, the player will "unlock" or otherwise have access to more outfits and other awards (e.g., new Playable Characters 108, new venues to sing, etc.). For example, as the player moves from a bar venue to a stadium venue, the outfit selection may become more elaborate. In Showtime mode, the currently selected Playable Character 108 wearing a most recently awarded outfit is presented to the player as a reminder of the player's progress in the game. In alternative embodiments, each song or song category could have associated with it a locked item (e.g., outfit), which will be made available to the player upon successful performance of the song or an entire song category.

Arcade Mode

The Arcade mode emulates an arcade game by allowing single and multi-player progressions. In a multi-player progression, each player selects their own Playable Character 108, outfit, singing key, skill level and song. The players take turn performing their selected songs. At the end of every round a recap scoring screen is displayed, which includes each player's ranking for that round, together with their overall score through the current round. In some embodiments, the player ranking system is similar to golf where the goal is to have the lowest score as possible. There can also be bonus pointes for achieving a Platinum Record or Gold Record awards. The player with the lowest score for the round (including points for Platinum and Gold Records) is the winner. In the case of tied scores, some examples of tie breaking criteria include: the player or team with the most Platinum records, the player or team with the most Gold records, the player or team with the lowest finish for the last round, the player or team with the lowest finish for the second to last round, and so forth.

In an alternative embodiment, the player ranking system is similar to a NASCAR circuit type scoring scheme, where first place player or team receives x points, second place player or team receives y points, etc. It should be apparent, however, that other player ranking systems can be used with the present embodiment, depending upon the game design. For example, performance ratings can be determined by the players themselves. Upon completion of a song by a player, the other players will use their respective control devices to assign a rating to the player. The ratings can be averaged to produce an average rating which can be turned into a score for the player or the player's team.

Karaoke Mode

The Karaoke mode provides the player with a more traditional Karaoke style experience. For example, the background graphics 102 and performance feedback interface are replaced with just a lyric bar and lyric position indicator (e.g., a bouncing white ball).

Training Mode

The Training mode is used to teach new players how to play the game and provide tips on singing. In some embodiments, this mode is composed of three different sections: How to Play, Sing Practice, and Lessons. Preferably, the easiest and most rudimentary information is near the beginning of each section and the most advanced material is at the end of each section. During Training mode, the in-game interface 100 is presented to the player to facilitate the training process. The instructions for each section is displayed as text and can be accompanied by voice-overs. In some embodiments, the player is presented with the list "How to Play," "Singing Lessons," and "How Music Works." Each section can include one or more modules that the player can watch and exercises to complete. The exercises can be scored and the player provided with a summary screen after completion of each activity. Some example lesson topics for the "How to Play" section could include: Microphone Input, In-Game Interface, and Scoring.

Practice Mode

Practice mode is a variant on Training mode and can be an option before starting a song in other modes (e.g., Showtime, Karaoke). At the Song Select interface 1000, the player is presented with the option to enter Practice mode to practice the selected song. In some embodiments, the venue for Practice mode is empty version (no crowd) of the Rehearsal Room venue. An intent of the Practice mode is to give a player a "dry run" at the song, so that when they actually perform the song, they have had an opportunity to learn the lyrics and song progression before performing in Showtime mode.

Game Progression

In some embodiments, the progression through the game will include multiple unique venues. The player will move through various stages in a linear fashion. The music choices will ramp in terms of difficulty from Beginner to Advanced. An example of a game level progression is show in Table IV below.

TABLE IV

Game Level Progression Example

| Level | Song Difficulty | Song Choice | Venue Possible | Score Platinum, Unlock |
|---|---|---|---|---|
| 1 | Beginner | A, B, C, D | Practice Room | Outfit 3 |
| 2 | Beginner | E, F, G, H | Street Corner, Karaoke Bar | Outfit 4 |
| 3 | Intermediate | I, J, K, L | Subway Platform, Bowling Alley | Outfit 5 |
| 4 | Intermediate | M, N, O, P | Small Club, State Fair | Outfit 6 |
| 5 | Intermediate | Q, R, S, T | TV Talent Show, TV Late Night | Outfit 7 |
| 6 | Advanced | U, V, W, X | Recording Studio | Outfit 8 |
| 7 | Advanced | Y, Z, AA, BB | Medium Club | Medium Club venue in other game modes (e.g., Practice mode, Karaoke mode, etc.) |
| 8 | Advanced | CC, DD, EE, FF | Stadium | Stadium venue in other game modes (e.g., Practice mode, Karaoke mode, etc.) |

As shown in Table IV, the player faces a progression in difficulty of song and size and complexity of the virtual environment 106. In some embodiments, songs are matched to venues at each skill level. For example, if a player chooses song P on level 4, the player goes to the Small Club venue. However, if the player selects song M on level 4, the player goes to the State Fair. Preferably, each skill level will have multiple venues. Following completion of a skill level, the results of a player's performance is displayed based on the rating categories shown in Table III.

Multiple Key Tracks

Figure 10:
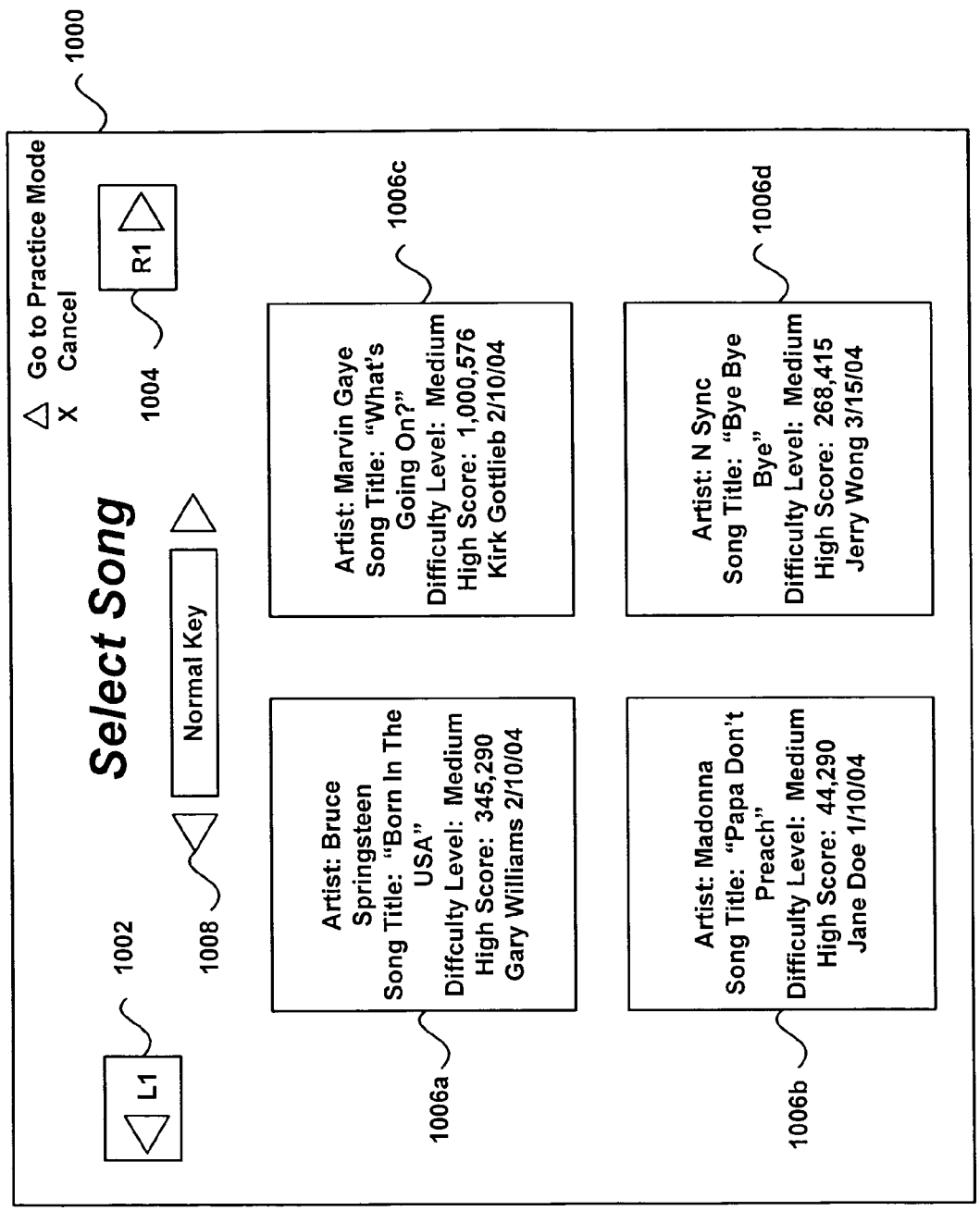
FIG. 10 is an illustration of an embodiment of an interface for selecting songs to perform in music video game.

Since different players will have different singing ranges, the underlying musical performances are preferably processed into multiple key tracks. For example, the underlying music can be processed into three key tracks: Normal, High and Low. The processing can be done at the time the song is recorded, using mastering equipment to automatically produce three different versions of the music. This will enable players to sing in the key that is most comfortable for them, and after a bit of experimentation, the player will know what they prefer to use. This will enable men to sing women's songs, and vice-versa. For example, a player can select a key prior to starting the song via the Song Selection interface 1000 (FIG. 10). Upon key selection, a clip of the song can be played. While the song is playing, the player can change the key using a Key Adjustment bar 1008 or other graphical control device. Once the player has selected the desired key, the song will be played in that key, thus allowing the player to perform in their most comfortable key even though the original performance may have been in a different key.

Sound Effects (SFX) & Independent Volume Adjustment Options

Figure 6:
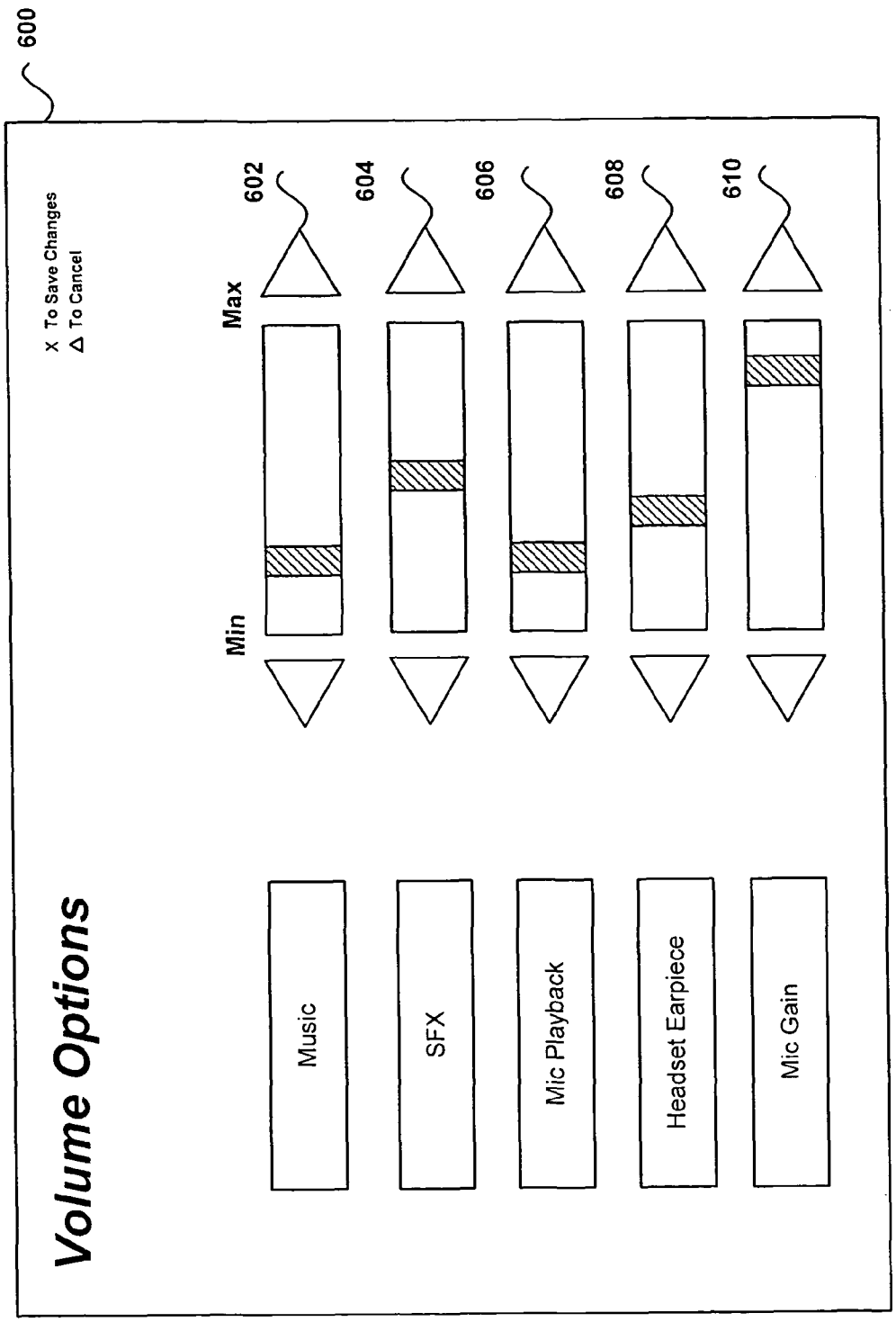
FIG. 6 is an illustration of an embodiment of an interface for selecting volume levels in a music video game.

FIG. 6 is an illustration of an embodiment of a user interface 600 for selecting volume levels in a music game. To enhance the player's sound, a suite of voice effects are made available to the player via a sound effects menu or other selection mechanism. Some examples of effects for the voice include, without limitation, reverb, delay, compressor, chorus, etc. Additionally, the player can independently adjust various volume levels using a graphical control device. The graphical device can resemble the slider typically found on a sound board in a recording studio. The various volume options that are adjustable are the underlying music 602, sound effects 604, microphone playback level 606, headset earpiece/monitor 608 and microphone gain 610. These volume adjustment options enable a player to achieve a desired mix, thus making their singing experience more enjoyable.

Menu System For Showtime Mode

Figure 7:
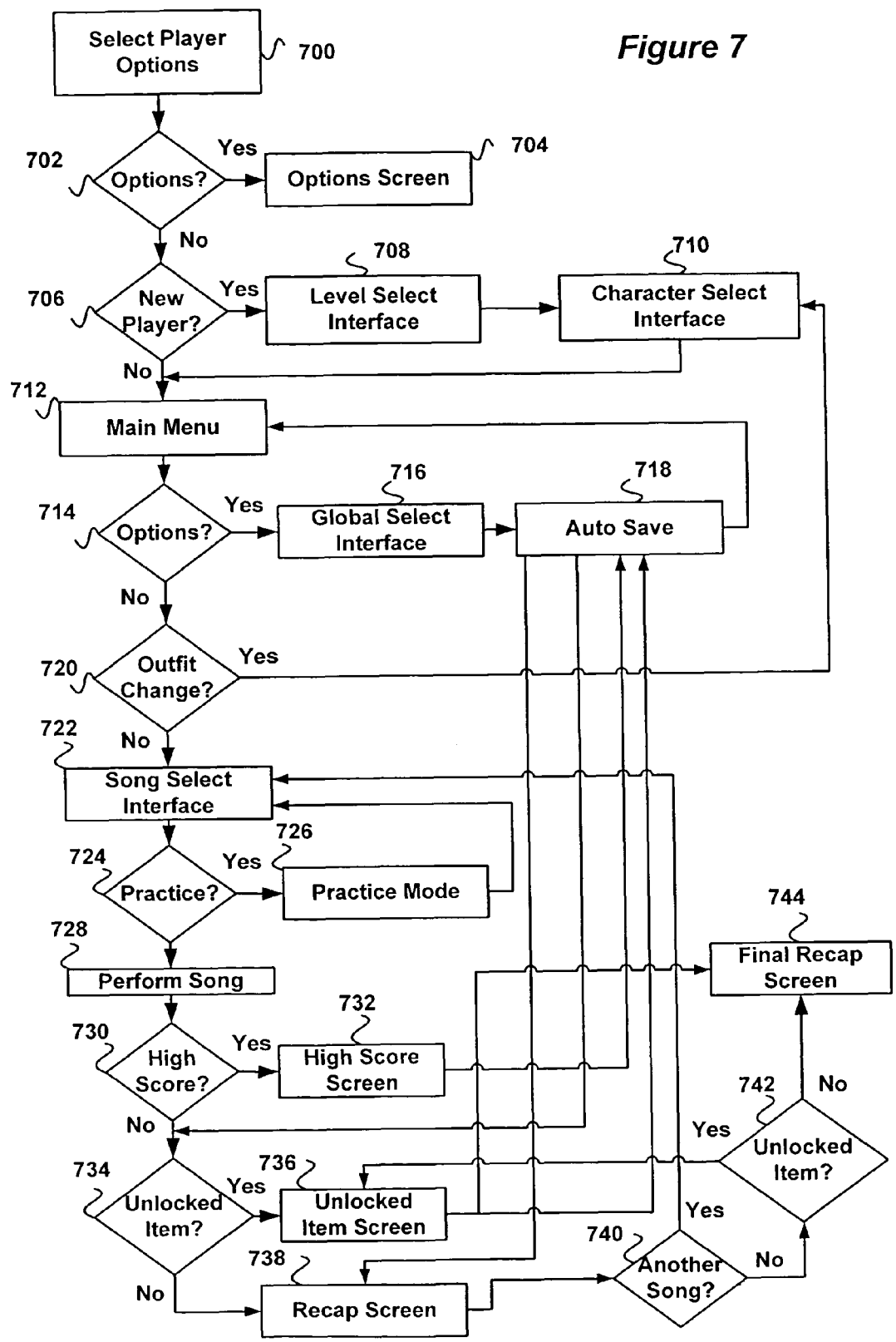
FIG. 7 is a flow diagram of an embodiment of a menu system for a music video game.

FIG. 7 is a flow diagram of an embodiment of a menu system for a music video game. Upon entering the Showtime mode, the player is presented with an initial Showtime Screen including several options (step 700). If the player selects an option (step 702), then the player is presented with an options screen (step 704). If the player does not select an option, then the player is queried by a text message to determine if the player is a new player (step 706). If the player is a new player, then the player is presented with a Level Select interface (FIG. 9) for selecting a desired level/stage of progression at which to start the game (step 708). Upon selection of a level, the player is presented with a Character Select interface (FIG. 8) for selecting a Playable Character 108 and outfit from a plurality of Playable Characters 108 and outfits (step 710).

If the player is not a new user or upon completion of step 710, then the player is presented with a Main Menu interface, which includes several options (step 712). If the player selects an option (step 714), then the player is presented with a Global Selection interface (step 716) for selecting various global options, such as volume adjustment options (FIG. 6). Any global options that are selected by the player are automatically saved to a player profile (step 718) and the player is again presented with the Main Menu interface (step 712).

If the player does not select an option from the Main Menu interface (step 714), then the player is queried with to determine if the player would like to make an outfit change for the Playable Character 108 (step 720). If the player would like to make an outfit change, then the player is presented with a Character Select interface (step 710). If the player does not want to make an outfit change, then the player is presented with a Song Select interface (step 722). Upon selection of a song, the player is queried to determine if they would like to practice the song in Practice mode before performing the song before a virtual audience (step 724). If the player would like to practice the song, then the player is transitioned into Practice mode (step 726). Upon completion of Practice mode, the player is transitioned back to the Song Select interface (FIG. 10), where the player can select another song to practice or perform the selected song (step 728).

Upon completion of the song, the game determines if the player achieved a high score (step 730). If the player achieved a High Score (e.g., the highest score achieved by any player), then the player is presented with a High Score screen (step 732) and the player's core is automatically saved as the High Score (step 718). If the player did not receive a high score, then the game determines if the player's score was sufficiently high to unlock any previously locked items (step 724). If the score was sufficiently high, then the player is presented with an Unlocked Item screen (step 736), which lists one or more items that have been unlocked based on the player's score. Any unlocked items selected by the player are automatically saved to a Player Profile (step 718) and the player is presented with a Final Recap screen (744).

If the player's score was not sufficiently high to unlock an item, then the player is presented with a Recap screen that recaps the player's scores (step 738). The player is also queried to determine if the player would like to select another song (step 740). If the player would like to select another song, then the player is presented with the Song Select interface (step 722). If the player does not want to select another song, the player is queried to determine if the player would like to select another unlocked item (step 742). If the player wants to select another unlocked item, then the player is again presented with the Unlocked Item screen (step 736). If the player does not want to select another unlocked item, then the player is presented with the Final Recap screen (step 744).

It should be apparent that the menu system can have more or fewer interfaces or screens that can be arranged and presented to the player in any order, as needed, based on the game design.

FIG. 8 is an illustration of an embodiment of a Character Select interface 800 for selecting characters and other options in a music video game. The Character Select interface 800 includes a player select mechanism 802 for selecting one of a several players (e.g., multiplayer mode), a character selection mechanism 804 for selecting a Playable Character 108, and an options selection mechanism 806 for selecting various options related to the Playable Character 108, such as selecting an outfit for the Playable Character 108. In some embodiments, the selection mechanisms 802, 804 and 806, can be scroll bars that allow the user to scroll through player names, Playable Characters and Options, respectively. The character selection mechanism 804 can provide a picture of each available Playable Character 108 to facilitate the player's selection process.

Figure 9:
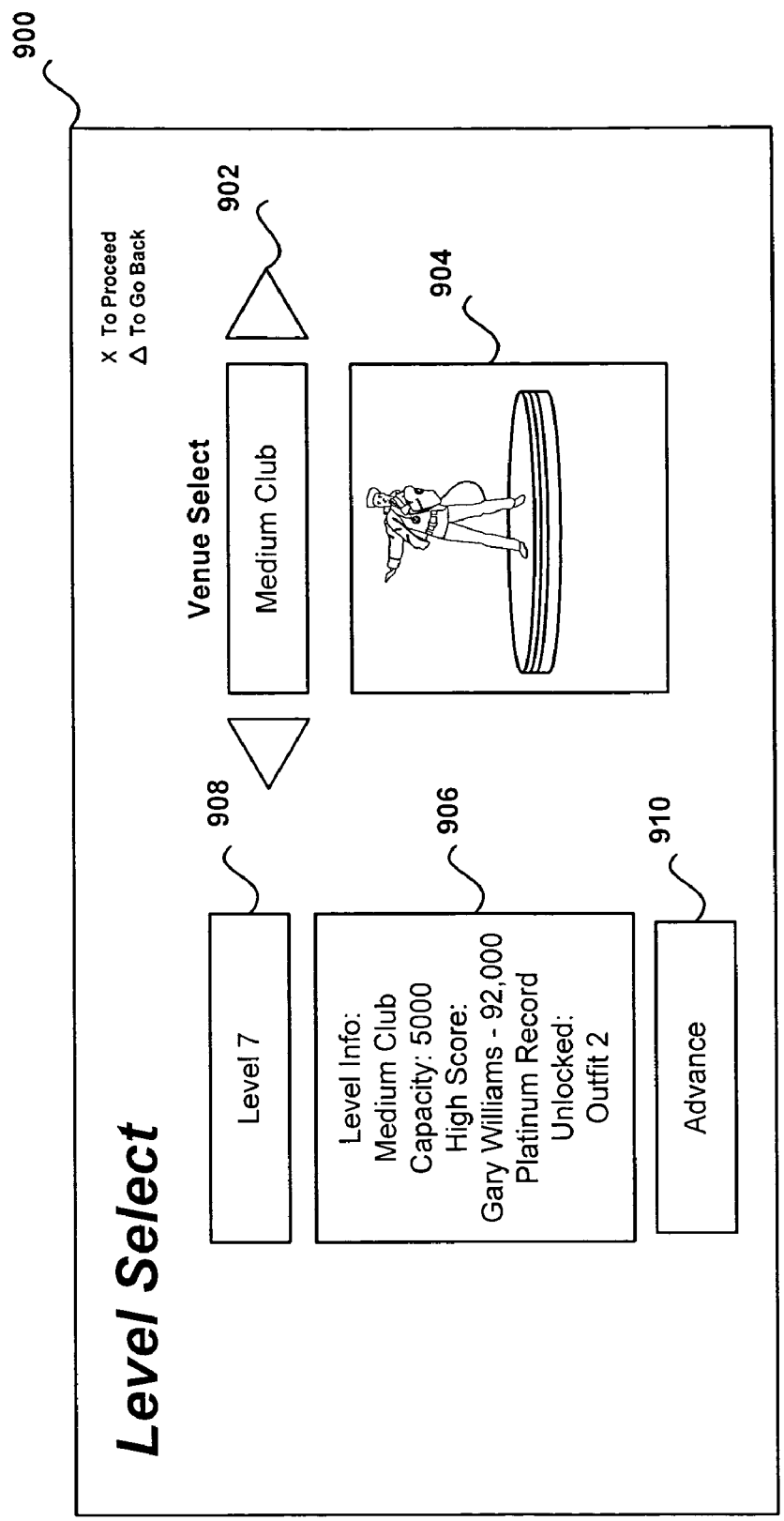
FIG. 9 is an illustration of an embodiment of an interface for selecting difficulty levels in a music video game.

FIG. 9 is an illustration of an embodiment of a Level Select interface 900 for selecting levels in a music video game. The Level Select interface 900 includes a selection mechanism 902 (e.g., scroll bar) for selecting a venue from a list of venues available for the currently selected level 902. A picture 904 of the venue is displayed to the player to facilitate the selection process. When a venue is selected, information 906 associated with the selected level 908 is displayed to the player. An advance mechanism 910 can be used by the player to loop through the available levels (e.g., levels 1-8).

FIG. 10 is an illustration of an embodiment of a Song Select interface 1000 for selecting songs in a music video game. The Song Select interface 1000 includes a selection mechanisms 1002 and 1004 (e.g., scroll buttons), for enabling the player to select up to four songs to perform. Information regarding the songs are presented to the player via display windows 1006. This information includes the name of the artist, the song title, and the High Score for the song, together with the name of the player who achieved the High Score and the date the High Score was achieved.

Note that the interfaces described with respect to FIGS. 8-10 are only examples of the many types of interfaces that can be used in the music video game. The interfaces can include more or fewer selection mechanisms and/or, as desired, depending on the game design.

Video Game Station Overview

Overall Architecture

Figure 11:
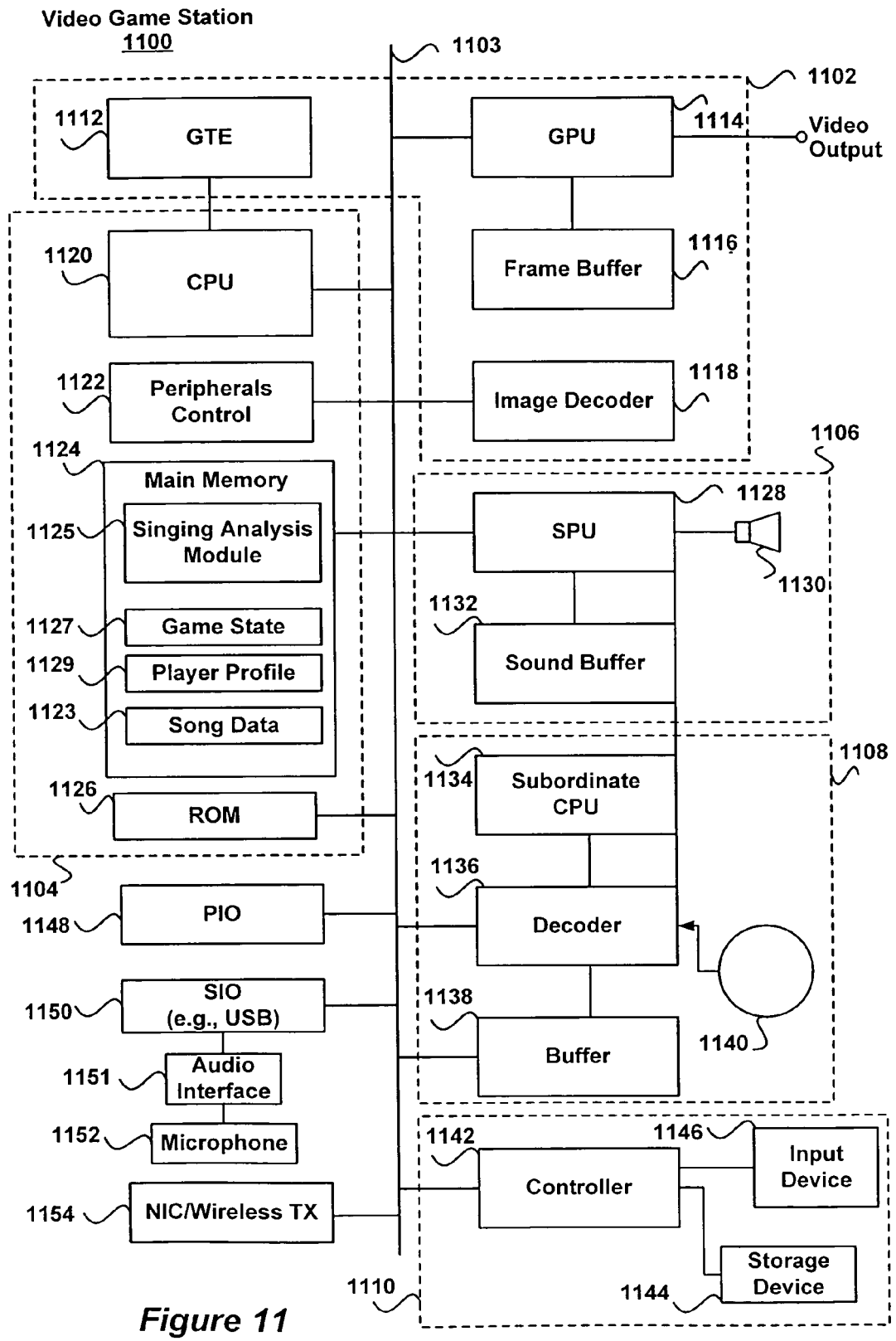
FIG. 11 is a block diagram of an embodiment of a video game station for hosting music video games.

FIG. 11 is a block diagram of an embodiment of a video game station 1100 for hosting video games (e.g., PLAYSTATION™). The video game station 1100 includes a graphics system 1102, a control system 1104, a sound system 1106, an optical disk controller 1108 and a communications controller 1110. These systems are interconnected by one or more buses 1103 for communicating data and control signals.

The graphics system 102 includes a geometry transfer engine (GTE) 1112, a graphics processing unit (GPU) 1114, a frame buffer 1116 and an image decoder 1118. The GPU 1114 is used to render graphics in the frame buffer 1116 for presentation on a display device, including sprite graphics and images, texture mapping, flat and Gouraud shading and the like. The GTE 1112 is used to execute high-speed matrix multiply operations, which are used in drawing flat-shaded, textured-mapped and light-sourced polygons. The image decoder 118 is used to decode compressed image data (e.g., MPEG).

The control system 1102 includes a central processing unit (CPU) 1120, a peripherals controller 1122, main memory 1124 (e.g. RAM) and non-volatile memory 1126 (e.g., ROM). In some embodiments, the CPU 1120 is a 32-bit RISC CPU configured to execute software instructions for a video game (e.g., Karaoke) stored in main memory 1124. The non-volatile memory 1126 stores an operating system that controls memory transactions and other administrative functions in the video game station 1100. The peripherals controller 1122 is responsible for handling interrupts from the various systems and direct memory access (DMA) requests to main memory 1124.

When power is introduced to the video game station 1100, the CPU 1120 runs the operating system stored in ROM 1126, enabling the CPU 1120 to control the graphics system 1102, sound system 1106, optical disk controller 1108 and communications controller 1110. When the operating system is running, the CPU 1120 performs initialization of the overall vide game station 1100 and verifies its operation. Upon completion of initialization, the CPU 1120 commands the optical disk controller 1108 to read instructions from an optical disk containing a video game (e.g., music video game). The instructions are read from the optical disk by the optical disk controller 1108 and stored in main memory 1124 to be executed by the CPU 1120. In some embodiments, these video game instructions implement a singing analysis module 1125 (FIG. 11) for performing various singing analysis functions, as described with respect to FIGS. 12-14.

During the course of playing the video game, several files are created in main memory 1124, including a Game State file 1127, a Player Profile file 1129 and a song data file 1123. The Game State file 1127 includes the current Game States (e.g., performance ratings, scores, etc.) for one or more players of the video game. The Player Profile file 1129 includes information related to the profile of a player, such as the Playable Character 108 and its outfit(s), the difficulty level, the venue, and the progress level of the player. In some embodiments, the song data file 1123 includes the audio track of the song selected to be performed, with an embedded data track (e.g., MIDI, Redbook Audio, etc.). In alternative embodiments, the song data file 1123 includes the audio track file and the data track is stored in a separate file. In some embodiments, the entire song is stored in main memory 1124, and in other embodiments, a portion of the song is stored in main memory 1124, and the optical disk is accessed from time to time to read new data.

In some embodiments, a network interface card (NIC) 1154 (e.g., Ethernet) is coupled to the bus 1103 and configured to communicate with a network (e.g., Internet, LAN, wireless LAN etc.). In such embodiments, songs can be streamed to the video game station 1100 from a remotely located streaming server using known streaming media protocols (e.g., UDP, MMS, RTSP/RTP, etc.).

The sound system 1106 includes a speech processing unit (SPU) 1128, a sound buffer 1132 and a speaker 1130. The SPU 1128 is used to generate music and sound effects in response to a command from the CPU 1120. The SPU 1128 uses the sound buffer 1132 to store music and sound effects data (e.g., waveform data) for output via the speaker 1130.

The optical disk controller 1108 includes an optical disk device 1140 for reading programs, data and the like that have been recorded on an optical disk (e.g., CD-ROM, DVD, etc.). A decoder 1136 decodes the programs and data that have been recorded on the optical disk. A buffer 1138 can be used to temporarily store data to speed-up the read-out from the optical disk. A subordinate CPU 1134 can be used to manage the reading of information from the optical disk to reduce the number of hits on the CPU 1120.

The communications system 1110 includes a controller 1142 for controlling communications with the CPU 1120 via the bus 1103. The controller 1142 is coupled to a control device (e.g., game controller) for receiving input commands from a player. Such commands can be used to navigate a menu system for a video game, such as the Showtime Mode menu system shown in FIG. 7. The controller 1142 is also coupled to a removable storage device 1144 (e.g., memory card) for storing data.

A parallel I/O interface (PIO) 1148 and serial I/O interface 1150 (SIO) are coupled to the bus 1103. In some environments, the serial I/O interface 1150 (e.g., Universal Serial Bus, FireWire™) is adapted for coupling to a microphone 1152 (e.g., a condenser microphone), which can be used by player in a Karaoke style video game. In an alternative embodiment, the microphone is replaced with a headset to be worn by a player. In other embodiments, the microphone or headset can be coupled to the serial I/O interface 1150 via a wireless transceiver (TX). The SIO 1150 can include an analog-to-digital (A/D) converter for converting the analog output of the microphone into a digital representation or, alternatively, an audio interface 1151 can be coupled between the microphone 1152 and the SIO 1150 for performing A/D conversion and signal conditioning (e.g., impedance matching, etc.).

Singing Analysis Module—Pitch Analysis

Figure 12:
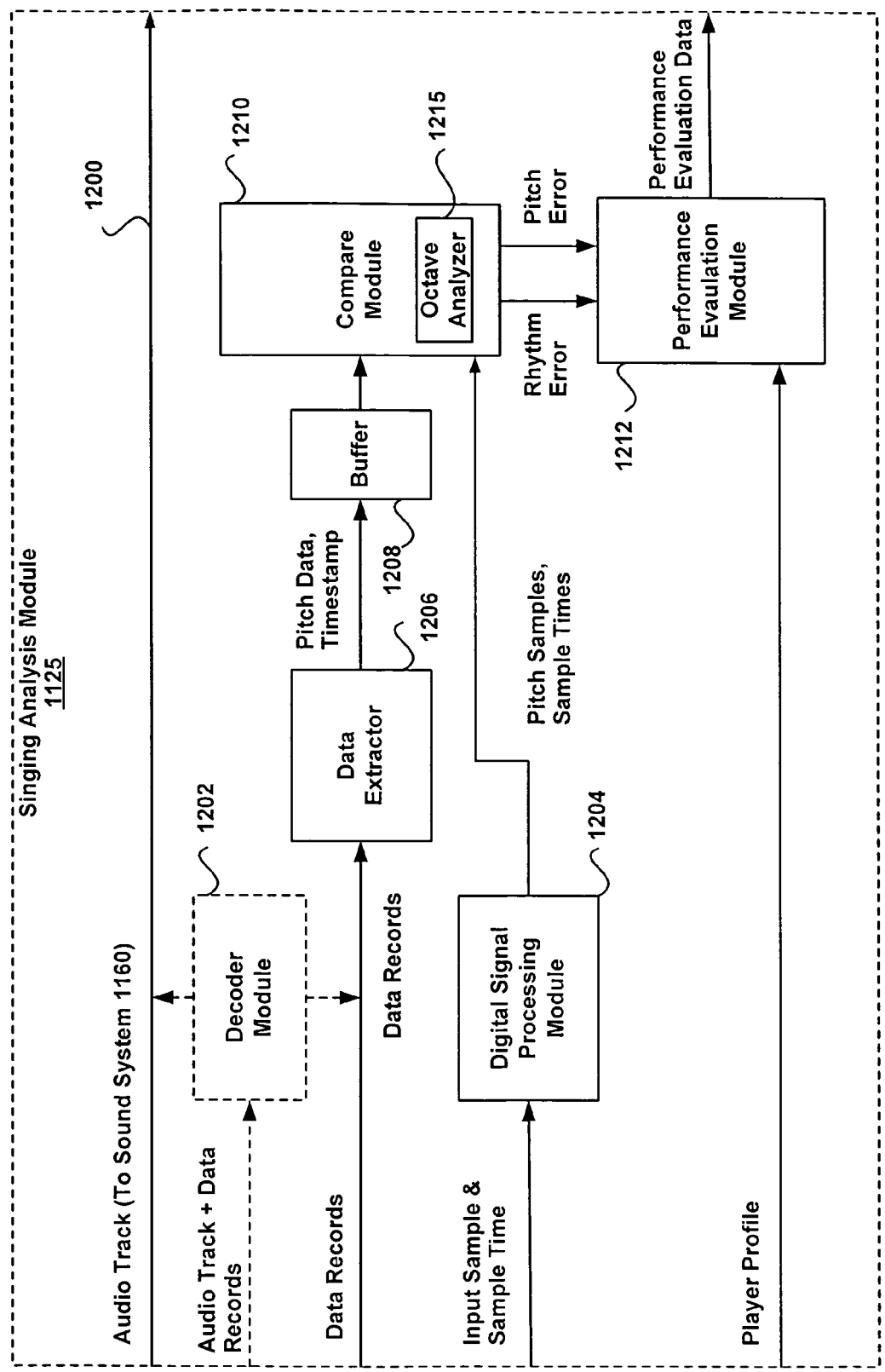
FIG. 12 is a block diagram of an embodiment of a singing analysis module for a music video game.

FIG. 12 is a block diagram of an embodiment of a singing analysis module 1125 for a music video game, such as a Karaoke style video game. The singing analysis module 1125 can be implemented in hardware or software or a combination of both. If separate files are used to store audio tracks (e.g. .wav files) and data records (e.g., MIDI event data), then the audio tracks are coupled directly to the sound system 1160 via path 1200 to be reproduced (e.g., sent to player's headset earpiece). The data records are received by a data extractor 1206, which extracts pitch data and timestamps stored in the data records. The pitch data and timestamps are stored in a buffer 1208 until retrieved by a compare module 1210 coupled to the buffer 1208.

The data records can be prepared a priori by stripping out the lead vocal track of a recorded song using known track ripping techniques, then analyzing each note to determine the correct pitch (e.g., fundamental frequency) using known pitch extraction techniques. Some suitable pitch extraction techniques include waveform processing (data reduction, zero crossing, etc.), correlation processing (autocorrelation, modified correlation, simplified inverse filter tracking (SIFT), average magnitude differential function (AMDF), etc.), and spectrum processing (Cepstrum, period histogram, etc.). Some of the foregoing techniques are described in Sadaoki Furui, *Digital Speech Processing, Synthesis, and Recognition*, Marcel Dekker, Inc., 1989, which is incorporated by reference herein in its entirety.

A timestamp in a data record represents a point in the song when the particular note associated with the pitch data is sung and can be initialized to zero when the song begins. It should be apparent that the data records are not limited to pitch information but may include other information, such as lyric related information and note bending information.

When the player sings or speaks into the microphone 1152, the microphone's input signal is sampled (e.g., 60 times per second) and converted into a digital data stream. The digital data stream is processed by a digital signal processing (DSP) module 1204, which extracts pitch frequency data from the digital data stream using known pitch extraction techniques (See *Furui*). In some embodiments, a time-based auto-correlation filter is used to determine the input signal's periodicity. The periodicity is then refined to include a fractional periodicity component. This period is converted into frequency data, which is then converted a semitone value or index using known conversion techniques. The semitone value may be similar to a MIDI note number, but may have both integer and fractional components (e.g., 50.3). While the pitch data is preferably represented as semitones, it should be apparent that the pitch data can be converted into any desired units (e.g., Hertz) for comparison with the sampled pitch data from the microphone 1152 input.

The compare module 1210 compares the timestamps of one or more data records with the sample time associated with the pitch sample. The compare module 1210 selects a data record from a plurality of data records stored in the buffer 1208 that has a timestamp that most closely matches the sample time, then compares the pitch value stored in that data record (i.e., correct pitch) with the pitch sample associated with sample time. In some embodiments, the comparison includes determining the absolute value of the difference between the correct pitch value and the sample pitch data. The result of this comparison is a pitch error (i.e., difference data), which is sent to a performance evaluation module 1212.

The performance evaluation module 1212 generates performance evaluation data based on the pitch error and a Player Profile. In some embodiments, the Player Profile includes information regarding the level of difficulty selected by the player. This information includes a target range 402, which can be compared against the pitch error to determine a performance rating. If the pitch error falls within the target range 402, then a "Hit" will be recorded, and if the pitch error falls outside the target range 402, then a "Miss" will be recorded. The Hit/Miss information is then used to compute a score and to drive or trigger the various performance feedback mechanisms previously described (e.g., pitch arrow, performance meter, crowd meter, etc.) with respect FIG. 1.

In some embodiments, the data records can be multiplexed or otherwise embedded in the audio track. In such embodiments, a decoder module 1202 (dashed line) is used to separate the data records from the audio track, so that the audio track and data records can be processed as previously described.

Compare Module

Figure 13:
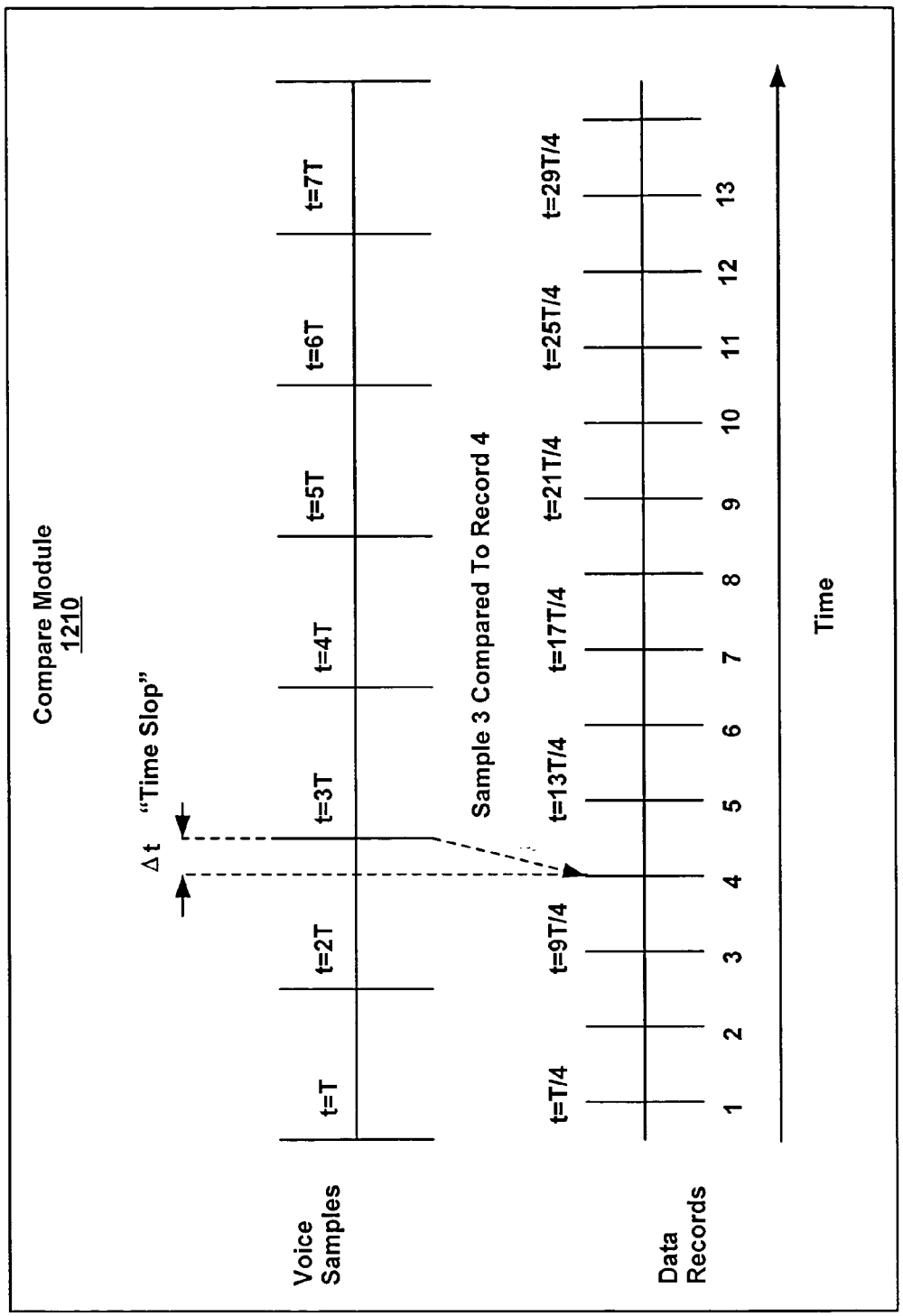
FIG. 13 is an illustration of an embodiment of the compare module of FIG. 12.

FIG. 13 is an illustration of an embodiment of the compare module 1210 of FIG. 12. The compare module 1210 provides an advantage over conventional techniques by comparing the sample time of a pitch sample with the timestamps of one or more data records. For example, a pitch sample taken at sample time t=3T can be compared to data records 4 and 5, since those records are closest in time to the sample time t=3T. If there is a tie between two data records, a predetermined tie breaking policy can be used select a data record (e.g., always select the data record with the earlier timestamp).

As can be observed from FIG. 13, there is a time difference Δt between the sample time t=3T and the timestamp of data record 4. This "time slop" allows simplification of the singing analysis module 1125. For example, the singing analysis module 1125 does not require precise synchronization between data records and input samples to perform pitch analysis. This allows the microphone input sampling to be independent of the timing of the data records. Therefore, the microphone can be continuously sampled even when the song is not being played, thus allowing the player to observe the pitch arrow 128 move when singing in the microphone even in the absence of a reference performance.

Singing Analysis Module—Rhythm Analysis

In some embodiments, the compare module 1210 provides rhythm error data to the performance evaluation module 1212 in addition to pitch error data. For example, the player may sing a note too early or too late, which may result in negative scoring even if the pitch was correct. To compute a rhythm error, the player is provided with an adjustable time window in which to sing the current note. The size of the window can be adjusted automatically by the game or manually by the player based on the game state or the difficulty level of the song. In some embodiments, if the player's attack of a note begins outside the time window, then a rhythm error has occurred. The rhythm error can be represented as a binary flag, which if set TRUE indicates that the player sang either too early or to late. The flag is received by the performance evaluation module 1212, which computes performance evaluation data reflecting the state of the flag, which in turn is used to drive one or more performance feedback mechanisms on the in-game interface 100.

Octave Independent Pitch Analysis

In one embodiment, an octave analyzer 1215 is located in the compare module 1210 and is configured to determine if the player has sung the note in an octave that is different than the underlying lead vocal track. In such a case, it would be unfair to negatively score the player who may have "hit" the correct pitch but in a different octave.

In some embodiments, the octave analyzer 1215 checks the computed pitch error (e.g., in semitones) against a target threshold value (e.g., 2.5 semitones). If the pitch error does not exceed the target threshold, then the octave analyzer 1215 assumes that the player is singing in the same octave as the reference performance and passes the computed pitch error to the performance evaluation module 1212. If the pitch error does exceed the target threshold and the player's pitch is lower than the correct pitch, then an octave (e.g., 12 semitones) is added to the player's pitch and the pitch error is recomputed to determine if it exceeds the target threshold. If the pitch error still exceeds the target threshold and the player's adjusted pitch is still lower than the correct pitch, another octave is added to the player's pitch and the pitch error is again recomputed to determine if it exceeds the target threshold. This procedure can be repeated for one or more octaves until the pitch error is less than the target threshold or the player's adjusted pitch exceeds the correct pitch.

Similarly, if the player's pitch is higher than the reference pitch, then one or more octaves can be subtracted from the player's pitch until the player's pitch is below the target threshold or the player's adjusted pitch is below the reference pitch. Upon determination that the player has sung the correct pitch to within a predefined target range, but in a different octave than that of the underlying lead vocal track, the player will be positively scored. Thus, the octave analyzer 1215 enables players to sing songs outside the players' comfortable singing ranges without being negatively scored by the game.

Performance Evaluation Module

Figure 14:
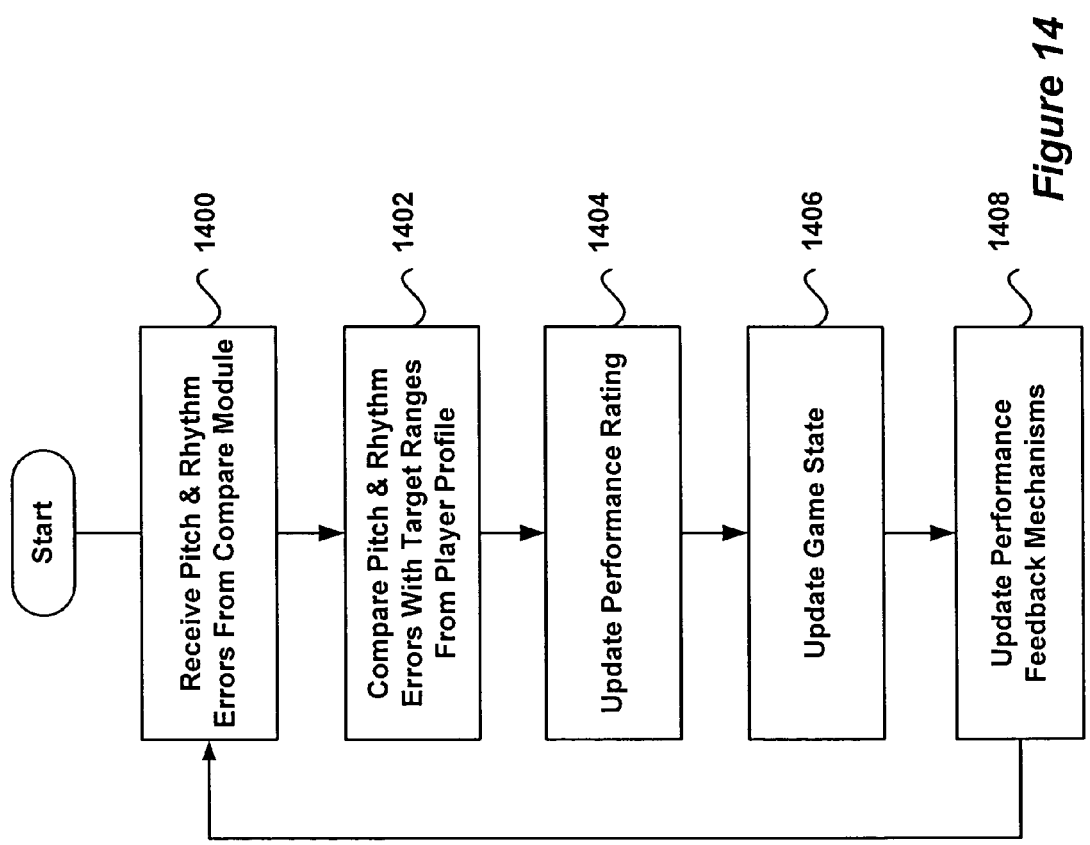
FIG. 14 is a flow diagram of an embodiment of a performance evaluation process implemented by the performance evaluation module of FIG. 12.

FIG. 14 is a flow diagram of an embodiment of a performance evaluation process implemented by the performance evaluation module 1212 of FIG. 12. The process is performed for each player each time pitch and rhythm errors are generated by the compare module 1210. In some embodiments, the performance evaluation process begins when the performance evaluation module 1212 receives pitch and rhythm errors (step 1400). Next, the pitch and rhythm errors are compared with target ranges provided by the Player Profile (step 1402). As previously discussed, the target ranges can be selected by the player or automatically by the game based on the difficulty of the song and/or Game State. The results of the comparison are used to determine the performance rating of the player (step 1404). This can be accomplished by using the scoring scheme previously described with respect to FIG. 3 (e.g., Yes: 1 point, OK: 0 points, No: 1 points). The performance rating can be determined for each note or for a plurality of notes (i.e., a phrase). The performance rating can also be based on a running average over several notes or phrases. Once the performance rating has been determined, the Game State is updated and saved in the Game State file 1127 (step 1406). The performance feedback mechanisms (e.g., performance meter 134, crowd meter 136, pitch arrow 128, score 112) are then updated to reflect the player's current Game State (step 1408), and the process returns to step 1400 for the next pitch and rhythm errors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A music video game apparatus, comprising:
    a first portion of an in-game interface, the first portion configured for displaying graphical representations of music notes of a musical composition, wherein the graphical representations of the music notes include note tubes that travel towards a fixed position on the first portion in an order of performance of the music notes, each note tube having a position and width indicative of a start time and indicative of how long the note should be held by a player, wherein a respective note tube visually transforms as it passes through the fixed position on the first portion;
    a compare module configured to compare the player's rhythm and pitch in a vocal performance of the musical composition with a reference performance of the musical composition provided by the music video game;
    a performance evaluation module coupled to the compare module and configured to generate performance evaluation data based on results of the comparison of the player's vocal performance with the reference performance; and
    a second portion of the in-game interface, the second portion including a first feedback display mechanism coupled to the performance evaluation module and configured to provide a first feedback indicative of the player's rhythm and pitch in the vocal performance of the musical composition based on the performance evaluation data.

2. The apparatus of claim 1, wherein the first feedback display mechanism indicates if the player has performed a pitch of the musical composition correctly.

3. The apparatus of claim 1, wherein the first feedback display mechanism indicates if the player has performed a rhythm of the musical composition correctly.

4. The apparatus of claim 1, wherein the first portion further comprises a music staff that moves from right to left during performance of the musical composition, the music staff including the graphical representations of the music notes.

5. The apparatus of claim 1, wherein at least one note tube is embellished to indicate an enhanced scoring opportunity.

6. The apparatus of claim 1, wherein the first portion further comprises:
    an animated representation of a music staff for displaying the graphical representations of notes.

7. The apparatus of claim 6, where the fixed position includes a highlight bar on the music staff for indicating to the player when to vocally perform a note of the musical composition.

8. The apparatus of claim 1, further comprising:
    a background portion configured to generate an animated representation of the player of the music video game and an animated virtual audience; and
    a third portion including a second feedback display mechanism coupled to the performance evaluation module and configured to provide a second feedback indicative of the reaction of the virtual audience to the player's performance of the musical composition.

9. The apparatus of claim 8, wherein the animated representation of the player is controlled at least in part by the performance evaluation data.

10. The apparatus of claim 8, where the animated representation of the virtual audience is controlled at least in part by the performance evaluation data.

11. The apparatus of claim 1, further comprising:
    a third portion configured to display lyrics corresponding to the notes of the musical composition to be sung by the player.

12. The apparatus of claim 1, further comprising:
    a third portion including a pitch arrow, which is configured to point up if the player sang a note too high in pitch and to point down if the player sang a note that is too low in pitch.

13. The apparatus of claim 1, wherein the performance evaluation data is based on an average of comparisons of the player's vocal performance with the reference performance.

14. The apparatus of claim 1, wherein the first feedback display mechanism is a bar graph that fills in response to the performance evaluation data.

15. The apparatus of claim 8, wherein the animated representation of the player includes animated lips, which are synchronized to the player's vocal performance of the musical composition provided by the music video game.

16. The apparatus of claim 1, wherein the first feedback display simulates the operation of a Volume Unit (VU) meter.

17. The apparatus of claim 1, wherein the compare module compares a plurality of notes of the player's vocal performance with a plurality of notes of the reference performance.

18. A music video game apparatus, comprising:
a background portion of an in-game interface, the background portion configured to generate an animated representation of a player of the music video game and a virtual audience;
a performance feedback interface configured to display graphical representations of music notes of a musical composition, wherein the graphical representations of the music notes include note tubes that travel towards a fixed position on the first portion in an order of performance of the music notes, each note tube having a position and width indicative of a start time and indicative of how long the note should be held by a player, wherein a respective note tube visually transforms as it passes through the fixed position on the first portion;
a compare module configured to compare the player's vocal performance of the musical composition with a reference performance of the musical composition provided by the music video game;
a performance evaluation module coupled to the compare module and configured to generate performance evaluation data for the player;
a first feedback mechanism disposed in the performance feedback interface and coupled to the performance evaluation module, the first feedback mechanism configured to provide a first feedback indicative of the player's rhythm and pitch in the vocal performance of the musical composition based on the performance evaluation data; and
a second feedback mechanism disposed in the performance feedback interface and coupled to the performance evaluation module, the second feedback mechanism configured to provide a second feedback indicative of the reaction of the virtual audience to the player's performance of the musical composition.

19. The apparatus of claim 18, wherein the first feedback mechanism indicates if the player has performed a pitch of the musical composition correctly.

20. The apparatus of claim 18, wherein the first feedback mechanism indicates if the player has performed a rhythm of the musical composition correctly.

21. The apparatus of claim 18, wherein at least one note tube is embellished to indicate to indicate an enhanced scoring opportunity.

22. The apparatus of claim 18, wherein the performance feedback interface, further comprises:
an animated representation of a music staff for displaying the graphical representations of notes.

23. The apparatus of claim 18, where the fixed position includes a highlight bar on the music staff for indicating to the player when to vocally perform a note of the musical composition.

24. The apparatus of claim 18, wherein the performance evaluation data is based on an average of comparisons of the player's vocal performance with the reference performance.

25. The apparatus of claim 18, wherein the first feedback mechanism is a bar graph that fills in response to the performance evaluation data.

26. A music video game apparatus comprising:
a first portion of an in-game interface, the first portion configured for displaying graphical representations of music notes of a musical composition, wherein the graphical representations of the music notes include note tubes that travel towards a fixed position on the first portion in an order of performance of the music notes, each note tube having a position and width indicative of a start time and indicative of how long the note should be held by a player, wherein a respective note tube visually transforms as it passes through the fixed position on the first portion;
a compare module configured to compare the player's vocal performance of the musical composition with a reference performance of the musical composition provided by the music video game; a performance evaluation module coupled to the compare module and configured to generate performance evaluation data based on results of the comparison of the player's vocal performance with the reference performance; and
a second portion of the in-game interface, the second portion including a first feedback display mechanism coupled to the performance evaluation module and configured to provide a first feedback indicative of the player's vocal performance of the musical composition based on the performance evaluation data.

27. The apparatus of claim 26, wherein an orientation of a respective note tube shows the player how to bend the corresponding note.

28. The apparatus of claim 26, the first portion configured for displaying lyrics of the musical composition, wherein each lyric syllable lines up vertically with a corresponding note tube displayed on the first portion.

29. The apparatus of claim 26, the first portion including a set of horizontal lines for displaying the note tubes in a manner indicative of relative pitch of the note tubes.

30. A computer-implemented method comprising:
displaying graphical representations of music notes of a musical composition on a first portion of a music video game, wherein the graphical representations of the music notes include note tubes that travel towards a fixed position on the first portion in an order of performance of the music notes, each note tube having a position and width indicative of a start time and indicative of how long the note should be held by a player, wherein a respective note tube visually transforms as it passes through the fixed position on the first portion;
comparing the player's vocal performance of the musical composition with a reference performance of the musical composition provided by the music video game;
generating performance evaluation data based on results of the comparison of the player's vocal performance with the reference performance; and
providing a first feedback indicative of the player's vocal performance of the musical composition based on the performance evaluation data.

31. The method of claim 30, wherein an orientation of a respective note tube shows the player how to bend the corresponding note.

32. The method of claim 30, further comprising:
displaying lyrics of the musical composition on the first portion, wherein each lyric syllable lines up vertically with a corresponding note tube displayed on the first portion.

33. The method of claim 30, further comprising:
displaying the note tubes in a manner indicative of relative pitch of the note tubes using a set of horizontal lines on the first portion.

34. A tangible computer readable storage medium storing one or more programs configured for execution by a computer, the one or more programs comprising instructions for:
displaying graphical representations of music notes of a musical composition on a first portion of a music video game, wherein the graphical representations of the music notes include note tubes that travel towards a fixed position on the first portion in an order of performance of the music notes, each note tube having a position and width indicative of a start time and indicative of how long the note should be held by a player, wherein a respective note tube visually transforms as it passes through the fixed position on the first portion;

comparing the player's vocal performance of the musical composition with a reference performance of the musical composition provided by the music video game;

generating performance evaluation data based on results of the comparison of the player's vocal performance with the reference performance; and providing a first feedback indicative of the player's vocal performance of the musical composition based on the performance evaluation data.

35. The computer readable storage medium of claim 34, wherein an orientation of a respective note tube shows the player how to bend the corresponding note.

36. The computer readable storage medium of claim 34, further comprising instructions for:

displaying lyrics of the musical composition on the first portion, wherein each lyric syllable lines up vertically with a corresponding note tube displayed on the first portion.

37. The computer readable storage medium of claim 34, further comprising instructions for:

displaying the note tubes in a manner indicative of relative pitch of the note tubes using a set of horizontal lines on the first portion.

38. A music video game apparatus, comprising:

a first portion of an in-game interface, the first portion configured for displaying graphical representations of music notes of a musical composition, wherein the graphical representations of the music notes include note tubes that travel towards a fixed position on the first portion in an order of performance of the music notes, each note tube having a position and width indicative of a start time and indicative of how long the note should be held by a player, wherein an orientation of a respective note tube shows the player how to bend the corresponding note;

a compare module configured to compare the player's rhythm and pitch in a vocal performance of the musical composition with a reference performance of the musical composition provided by the music video game;

a performance evaluation module coupled to the compare module and configured to generate performance evaluation data based on results of the comparison of the player's vocal performance with the reference performance; and a second portion of the in-game interface, the second portion including a first feedback display mechanism coupled to the performance evaluation module and configured to provide a first feedback indicative of the player's rhythm and pitch in the vocal performance of the musical composition based on the performance evaluation data.

39. A music video game apparatus, comprising:

a background portion of an in-game interface, the background portion configured to generate an animated representation of a player of the music video game and a virtual audience;

a performance feedback interface configured to display graphical representations of music notes of a musical composition, wherein the graphical representations of the music notes include note tubes that travel towards a fixed position on the first portion in an order of performance of the music notes, each note tube having a position and width indicative of a start time and indicative of how long the note should be held by a player, wherein an orientation of a respective note tube shows the player how to bend the corresponding note;

a compare module configured to compare the player's vocal performance of the musical composition with a reference performance of the musical composition provided by the music video game;

a performance evaluation module coupled to the compare module and configured to generate performance evaluation data for the player;

a first feedback mechanism disposed in the performance feedback interface and coupled to the performance evaluation module, the first feedback mechanism configured to provide a first feedback indicative of the player's rhythm and pitch in the vocal performance of the musical composition based on the performance evaluation data; and a second feedback mechanism disposed in the performance feedback interface and coupled to the performance evaluation module, the second feedback mechanism configured to provide a second feedback indicative of the reaction of the virtual audience to the player's performance of the musical composition.

40. A music video game apparatus comprising:

a first portion of an in-game interface, the first portion configured for displaying graphical representations of music notes of a musical composition, wherein the graphical representations of the music notes include note tubes that travel towards a fixed position on the first portion in an order of performance of the music notes, each note tube having a position and width indicative of a start time and indicative of how long the note should be held by a player, wherein an orientation of a respective note tube shows the player how to bend the corresponding note;

a compare module configured to compare the player's vocal performance of the musical composition with a reference performance of the musical composition provided by the music video game;

a performance evaluation module coupled to the compare module and configured to generate performance evaluation data based on results of the comparison of the player's vocal performance with the reference performance; and a second portion of the in-game interface, the second portion including a first feedback display mechanism coupled to the performance evaluation module and configured to provide a first feedback indicative of the player's vocal performance of the musical composition based on the performance evaluation data.

41. A computer-implemented method comprising:

displaying graphical representations of music notes of a musical composition on a first portion of a music video game, wherein the graphical representations of the music notes include note tubes that travel towards a fixed position on the first portion in an order of performance of the music notes, each note tube having a position and width indicative of a start time and indicative of how long the note should be held by a player, wherein an orientation of a respective note tube shows the player how to bend the corresponding note;

comparing the player's vocal performance of the musical composition with a reference performance of the musical composition provided by the music video game;

generating performance evaluation data based on results of the comparison of the player's vocal performance with the reference performance; and providing a first feedback indicative of the player's vocal performance of the musical composition based on the performance evaluation data.

42. A tangible computer readable storage medium storing one or more programs configured for execution by a computer, the one or more programs comprising instructions for:

displaying graphical representations of music notes of a musical composition on a first portion of a music video game, wherein the graphical representations of the music notes include note tubes that travel towards a fixed position on the first portion in an order of performance of the music notes, each note tube having a position and width indicative of a start time and indicative of how long the note should be held by a player, wherein an orientation of a respective note tube shows the player how to bend the corresponding note;

comparing the player's vocal performance of the musical composition with a reference performance of the musical composition provided by the music video game;

generating performance evaluation data based on results of the comparison of the player's vocal performance with the reference performance; and providing a first feedback indicative of the player's vocal performance of the musical composition based on the performance evaluation data.

* * * * *

UNITED STATES PATENT AND TRADEMARK OFFICE
CERTIFICATE OF CORRECTION

PATENT NO. : 7,806,759 B2  
APPLICATION NO. : 10/846420  
DATED : October 5, 2010  
INVENTOR(S) : Mike McHale et al.

Page 1 of 1

It is certified that error appears in the above-identified patent and that said Letters Patent is hereby corrected as shown below:

IN THE CLAIMS:

Column 23, line 43, claim 21, please delete "to indicate to indicate" and insert -- to indicate --.

Signed and Sealed this
Fifth Day of June, 2012

David J. Kappos
*Director of the United States Patent and Trademark Office*